US 8,301,353 B2

(12) United States Patent
Ono et al.

(10) Patent No.: US 8,301,353 B2
(45) Date of Patent: *Oct. 30, 2012

(54) VEHICLE MOTION CONTROL DEVICE AND CONTROL METHOD

(75) Inventors: Eiichi Ono, Toyota (JP); Yoshikazu Hattori, Nisshin (JP)

(73) Assignees: Kabushiki Kaisha Toyota Chuo Kenkyusho, Aichi-Gun (JP); Toyota Jidosha Kabushiki Kaisha, Toyota (JP); JTEKT Corporation, Osaka (JP)

( * ) Notice: Subject to any disclaimer, the term of this patent is extended or adjusted under 35 U.S.C. 154(b) by 888 days.

This patent is subject to a terminal disclaimer.

(21) Appl. No.: 12/282,141

(22) PCT Filed: Mar. 29, 2007

(86) PCT No.: PCT/JP2007/056975
§ 371 (c)(1),
(2), (4) Date: Sep. 8, 2008

(87) PCT Pub. No.: WO2007/114299
PCT Pub. Date: Oct. 11, 2007

(65) Prior Publication Data
US 2009/0063002 A1   Mar. 5, 2009

(30) Foreign Application Priority Data
Mar. 31, 2006  (JP) .................. 2006-101065

(51) Int. Cl.
*B60T 8/172*   (2006.01)
*B60T 8/1755*  (2006.01)
*B62D 6/00*    (2006.01)

(52) U.S. Cl. ................ 701/90; 701/69; 701/83; 701/88; 701/89

(58) Field of Classification Search .................... 701/72, 701/73, 83, 90; 180/6.24, 6.26, 6.28; 303/146
See application file for complete search history.

(56) References Cited

U.S. PATENT DOCUMENTS
6,027,183 A   2/2000  Katayose et al.
(Continued)

FOREIGN PATENT DOCUMENTS
DE   41 33 060 A1   4/1993
(Continued)

OTHER PUBLICATIONS

Ono et al., Estimation of Tire Friction Circle and Vehicle Dynamics Integrated Control for Four-Wheel Distributed Steering and Four-Wheel Distributed Traction/Braking Systems, Dec. 2005, R&D Review of Toyota CRDL, vol. 40, No. 4, pp. 7-13, retrieved from https://www.tytlabs.co.jp/japanese/review/rev404pdf/404_007ono.pdf.*

(Continued)

*Primary Examiner* — Thomas Black
*Assistant Examiner* — Lindsay M Browder
(74) *Attorney, Agent, or Firm* — Oliff & Berridge, PLC

(57) ABSTRACT

A vehicle motion control device and method computes a size of a using friction circle in each of wheels by multiplying a size of an each wheel friction circle indicating a maximum generating force in each of the wheel tires by a previously computed each wheel using percentage, computes the each wheel tire generating force and the each wheel using percentage indicating a rate with respect to an upper limit value of a μ-using efficiency in each of the wheels, and controls a vehicle motion in such a manner that the computed each wheel tire generating force is obtained on the basis of the computed each wheel tire generating force, thereby minimizing an upper limit of the μ-using efficiency in each of the wheels.

20 Claims, 5 Drawing Sheets

U.S. PATENT DOCUMENTS

| | | | | |
|---|---|---|---|---|
| 6,132,014 A | * | 10/2000 | Kiso et al. | 303/146 |
| 6,219,610 B1 | * | 4/2001 | Araki | 701/72 |
| 6,236,926 B1 | * | 5/2001 | Naitou | 701/70 |
| 6,292,734 B1 | * | 9/2001 | Murakami et al. | 701/84 |
| 6,360,150 B1 | * | 3/2002 | Fukushima et al. | 701/41 |
| 6,442,469 B1 | * | 8/2002 | Matsuno | 701/70 |
| 6,598,946 B2 | * | 7/2003 | Nagae | 303/190 |
| 6,659,570 B2 | * | 12/2003 | Nakamura | 303/146 |
| 6,702,717 B2 | * | 3/2004 | Murakami | 477/182 |
| 6,859,715 B2 | * | 2/2005 | Lee et al. | 701/89 |
| 6,892,123 B2 | * | 5/2005 | Hac | 701/48 |
| 6,922,624 B2 | * | 7/2005 | Isaji et al. | 701/70 |
| 6,941,212 B2 | * | 9/2005 | Sakata | 701/72 |
| 7,035,726 B2 | * | 4/2006 | Sakata | 701/72 |
| 7,065,442 B2 | * | 6/2006 | Sakata | 701/72 |
| 7,066,560 B2 | * | 6/2006 | Kato et al. | 303/140 |
| 7,216,942 B2 | * | 5/2007 | Yasutake et al. | 303/140 |
| 7,315,777 B2 | * | 1/2008 | Ono | 701/70 |
| 7,316,457 B2 | * | 1/2008 | Taniguchi et al. | 303/147 |
| 7,353,098 B2 | * | 4/2008 | Sakata | 701/38 |
| 7,373,236 B2 | * | 5/2008 | Matsuno et al. | 701/80 |
| 7,440,834 B2 | * | 10/2008 | Yamaguchi et al. | 701/69 |
| 7,441,627 B2 | * | 10/2008 | Ohta et al. | 180/446 |
| 7,562,948 B2 | * | 7/2009 | Matsumoto et al. | 303/146 |
| 7,567,865 B2 | * | 7/2009 | Koibuchi et al. | 701/70 |
| 7,571,043 B2 | * | 8/2009 | Sakata | 701/72 |
| 2002/0082762 A1 | | 6/2002 | Tanaka et al. | |
| 2004/0186647 A1 | | 9/2004 | Ono | |
| 2005/0080545 A1 | | 4/2005 | Takagi | |
| 2006/0015236 A1 | | 1/2006 | Yamaguchi et al. | |

FOREIGN PATENT DOCUMENTS

| | | |
|---|---|---|
| DE | 102 53 261 A1 | 5/2004 |
| EP | 1 521 146 A2 | 4/2005 |
| JP | A-10-086622 | 4/1998 |
| JP | A-10-167036 | 6/1998 |
| JP | A-2002-127887 | 5/2002 |
| JP | A-2004-249971 | 9/2004 |
| JP | A-2005-067229 | 3/2005 |
| JP | A-2005-114074 | 4/2005 |
| JP | A-2005-145252 | 6/2005 |
| JP | A-2005-145256 | 6/2005 |
| WO | WO 02/053428 A1 | 7/2002 |
| WO | WO2004106116 * | 12/2004 |

OTHER PUBLICATIONS

Extended European Search Report issued in EP 07740413.5, dated Feb. 4, 2011.

Ono et al., "Vehicle dynamics integrated control for four-wheel-distributed steering and four-wheel-distributed traction/braking systems," Vehicle System Dynamics, vol. 44, No. 2, Feb. 2006, 139-151. (full text).

Ono et al., "Clarification and Achievement of Theoretical Limitation in Vehicle Dynamics Integrated Management," Journal of Environment and Engineering, vol. 4, No. 1, 2009, pp. 89-100.

* cited by examiner

RESULT OF COMPUTATION IN CASE THAT $r_i = 1$ IS FIXED
TARGET VALUE: $F_{x0}=-3000$ N, $F_{y0}=3000$ N, $M_{z0}=5000$ Nm
COMPUTED VALUE: $F_x=-3000$ N, $F_y=3000$ N, $M_z=5000$ Nm

RESULT OF COMPUTATION OF PROPOSED ALGORITHM
TARGET VALUE: $F_{x0}=-3000$ N, $F_{y0}=3000$ N, $M_{z0}=5000$ Nm
COMPUTED VALUE: $F_x=-3009$ N, $F_y=2999$ N, $M_z=4998$ Nm

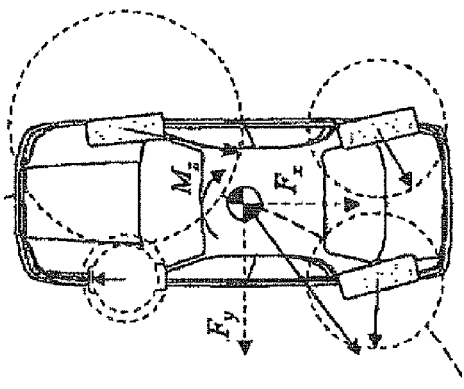

FIG. 5C

OUTWARD MOMENT COMMAND
(ROLL RIGIDITY DISTRIBUTION = 1:0)
$F_x=-6000N$, $F_y=8000N$,
$M_z=-14587Nm$ (LIMIT VALUE)
→ IMPROVE AT 16.7%

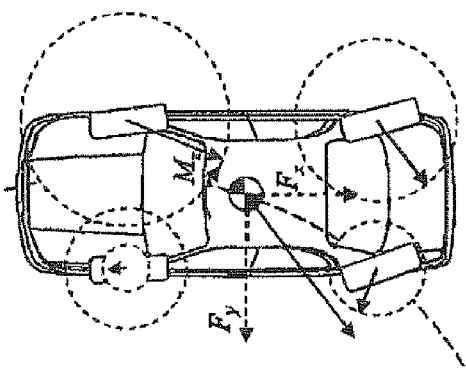

FIG. 5B

OUTWARD MOMENT COMMAND
(ROLL RIGIDITY DISTRIBUTION = 6:4)
$F_x=-6000N$, $F_y=8000N$,
$M_z=-12500Nm$ (LIMIT VALUE)

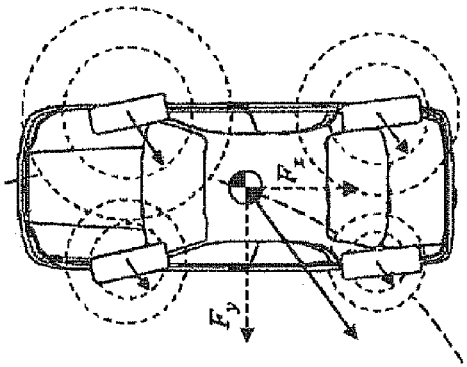

FIG. 5A

MOMENT COMMAND = 0
(ROLL RIGIDITY DISTRIBUTION=6:4)
$F_x=-6000N$, $F_y=8000N$,
$M_z=0Nm$
$\mu$-USING EFFICIENCY = 0.62

OPTIMUM TIRE GENERATING FORCE DISTRIBUTION DURING TURNING BRAKING
(ROAD SURFACE $\mu=1.0$)

VEHICLE MOTION CONTROL DEVICE AND CONTROL METHOD

TECHNICAL FIELD

The present invention relates to a vehicle motion control device and control method, and more particularly to a vehicle motion control device and control method which may minimize an upper limit of a µ-using efficiency of each of wheels in the case of achieving on the basis of a vehicle integrated control controlling a generating force in each of the wheel tires to a target value by putting braking and driving forces and steering angles together.

BACKGROUND ART

Conventionally, there has been proposed a four-wheel independent steering and independent braking and driving control which maximizes a grip additional coverage in each of the wheels, that is, minimizes the µ-using efficiency of each of the wheels, in the case of achieving target vehicle body resultant force and yaw moment in a vehicle motion (patent document 1). In this case, reference symbol k denotes a friction coefficient between a tire and a road surface. In this prior art, under a constraint condition that the µ-using efficiency in each of the wheels is equalized, a tire generating force direction in each of the wheels in which the µ-using efficiency becomes minimum is derived in accordance with a repeated computation of a pseudo-inverse matrix.

In the prior art mentioned above, an optimum solution (a solution minimizing the µ-using efficiency) under the constraint condition that the µ-using efficiency in each of the wheels is equalized coincides with a solution minimizing a maximum value of the µ-using efficiency in each of the wheels in many cases.

Patent Document 1: Japanese Patent Application Laid-Open (JP-A) No. 2004-249971

DISCLOSURE OF THE INVENTION

Problem to be Solved by the Invention

However, in the prior art mentioned above, there is generated a status that the maximum value of the µ-using efficiency in each of the wheels may be reduced by infrequently lowering the µ-using efficiency of a certain wheel in comparison with the µ-using efficiency of the other wheels. This status indicates "there is a case that the minimization of the upper limit of the µ-using efficiency may not be achieved" in the case of the vehicle motion control utilizing the prior art mentioned above. Accordingly, there is a problem that the upper limit of the µ-using efficiency may not be minimized in the prior art.

The invention is made in order to dissolve the problem mentioned above, and an object of the invention is to provide a vehicle motion control device and control method which may again intend an optimization by setting a using percentage in each of wheels corresponding to a displacement from a solution of an equalization to a new parameter, on the assumption that an optimum solution exists in addition to the solution of equalizing the µ-using efficiency in the prior art, and may always minimize an upper limit of the µ-using efficiency in a vehicle integrated control.

Means for Solving the Problem

In order to achieve the object mentioned above, in accordance with the invention, there is provided a vehicle motion control device including: a using friction circle computing unit for computing the size of a using friction circle in each of wheels by multiplying the size of an each wheel friction circle indicating a maximum generating force in each of the wheel tires by a previously computed each wheel using percentage; an each wheel generating force computing unit for computing the each wheel tire generating force and the each wheel using percentage indicating a rate with respect to an upper limit value of a µ-using efficiency in each of the wheels, on the basis of a target vehicle body force and moment indicating a target vehicle body longitudinal force, a target vehicle body transverse force and a target yaw moment, and the sizes of the using friction circle computed by the using friction circle computing means; and a control unit for controlling a vehicle motion in such a manner that the computed each wheel tire generating force is obtained on the basis of the computed each, wheel tire generating force.

In the invention, paying attention to the fact that the solution minimizing the upper limit of the µ-using efficiency coincides with the solution equalizing the µ-using efficiency, in a combination of the vehicle body force and the moment of most target vehicle body force and moment, the size of the using friction circle in each of the wheels is computed by multiplying the size of the each wheel friction circle by the previous value of each wheel using percentage which is corrected, and the each wheel tire generating force and the each wheel using percentage are computed on the basis of the target vehicle body force and moment and the size of the computed using friction circle, and the vehicle motion is controlled in such a manner that the computed each wheel tire generating force may be obtained.

In the invention, since the each wheel using percentage is used, the upper limit of the each wheel µ-using efficiency may be minimized.

The each wheel generating force computing unit in accordance with the invention may be constructed so as to include an each wheel generating force direction computing unit for computing a direction of the each wheel tire generating force minimizing the upper limit value of the µ-using efficiency under the constraint condition that the target vehicle body force and moment are achieved, on the basis of the target vehicle body force and moment and the size of the using friction circle in each of the wheels; an each wheel using percentage computing unit for computing an each wheel using percentage indicating a rate with respect to the upper limit value of the µ-using efficiency in each of the wheels in such a manner as to lower the upper limit value of the µ-using efficiency under the constraint condition that the target vehicle body force and moment are achieved; an each wheel generating force direction correcting unit for correcting the direction of the each wheel tire generating force in correspondence to the each wheel using percentage computed by the each wheel using percentage computing unit, in such a manner as to achieve the target vehicle body force and moment; and an each wheel generating force corrected computing unit for computing the each wheel tire generating force on the basis of the computed each wheel using percentage, the corrected each wheel tire generating force direction, and the minimized upper limit value of the µ-using efficiency.

The each wheel tire generating force direction and the each wheel using percentage may be optimized in two stages, by structuring as mentioned above. In other words, the step first computes the each wheel tire generating force direction minimizing the upper limit of the µ-using efficiency, and next computes the each wheel using percentage only in the case that the upper limit of the µ-using efficiency may be lowered by computing the each wheel using percentage. An efficiency of the computation may be increased in comparison with the case that all is optimized in a lump, by divisionally computing the each wheel tire generating force direction and the each wheel using percentage in two stages, as mentioned above.

Further, the control unit in accordance with the invention may be constructed so as to include a control amount computing unit for computing a first control amount controlling at least one of a braking force or a driving force in each of the wheels, or the first control amount and a second control amount controlling a steered angle of each of the wheels, on the basis of the each wheel tire generating force computed by the each wheel generating force computing unit; and a braking and driving steered angle control unit for controlling at least one of the braking force or the driving force in each of the wheels on the basis of the first control amount, or controlling at least one of the braking force or the driving force in each of the wheels and the steered angle of each of the wheels on the basis of the first control amount and the second control amount.

Further, the vehicle motion control device in accordance with the invention may be constructed so as to control a µ-using efficiency in such a manner that a µ-using efficiency of a wheel in which a yaw moment in a reverse direction to a target yaw moment is generated becomes smaller in comparison with a µ-using efficiency of the other wheels, in the case that the yaw moment in the reverse direction is generated in the wheel, at a time of generating a tire generating force in each of the wheels in the direction of a target vehicle body force comprising a target vehicle body longitudinal force and a target vehicle body transverse force.

Further, the vehicle motion control device in accordance with the invention may be constructed so as to control the µ-using efficiency in such a manner that a µ-using efficiency of a wheel in which a yaw moment in a reverse direction to a target yaw moment is generated becomes smaller in comparison with a µ-using efficiency of the other wheels, in the case that the yaw moment in the reverse direction is generated in the wheel, at a time of generating a tire generating force in each of the wheels in the direction of a target vehicle body force comprising a target vehicle body longitudinal force and a target vehicle body transverse force. In this case, it is effective to carry out the control of the µ-using efficiency in the case that a product of the size of the target vehicle body longitudinal force and the target vehicle body transverse force and a representative length of a moment arm from a tire position to a center of gravity of the vehicle approximately coincides with the size of the target yaw moment.

The vehicle motion control device in accordance with the invention may be structured such as to further control as follows.

The vehicle motion control device controls the µ-using efficiency of a turning inner front wheel so as to become smaller in comparison with the µ-using efficiency of the other wheels, at a time when an outward yaw moment is demanded during a turning braking.

The vehicle motion control device controls the µ-using efficiency of a turning outer rear wheel so as to become smaller in comparison with the µ-using efficiency of the other wheels, at a time when an inward yaw moment is demanded during a turning braking.

The vehicle motion control device controls the µ-using efficiency of a turning outer front wheel so as to become smaller in comparison with the µ-using efficiency of the other wheels, at a time when an outward moment is demanded during a turning acceleration.

The vehicle motion control device controls the µ-using efficiency of a turning inner rear wheel so as to become smaller in comparison with the µ-using efficiency of the other wheels, at a time when an inward moment is demanded during a turning acceleration.

In the invention, the vehicle motion control device may control a load in each of the wheels in such a manner as to lower the load in the wheel to be controlled in the case of controlling the µ-using efficiency so as to become smaller in comparison with the µ-using efficiency of the other wheels in the case that the yaw moment in the reverse direction to the target yaw moment is generated in the wheel, at a time of generating a tire generating force in each of the wheels in the direction of a target vehicle body force comprising a target vehicle body longitudinal force and a target vehicle body transverse force.

In the case of controlling the each wheel load, a roll rigidity distribution may be distributed as follows.

A roll rigidity distribution is distributed larger to the front wheels so that a load of a turning inner front wheel is lowered in the case that an outward moment is demanded during a turning braking and the µ-using efficiency of the turning inner front wheel is controlled so as to become smaller in comparison with the µ-using efficiency of the other wheels.

A roll rigidity distribution is distributed larger to the front wheels so that the load of a turning outer rear wheel is lowered in the case that a inward moment is demanded during a turning braking and the µ-using efficiency of the turning outer rear wheel is controlled so as to become smaller in comparison with the µ-using efficiency of the other wheels.

A roll rigidity distribution is distributed larger to the rear wheels so that the load of a turning outer front wheel is lowered in the case that a outward moment is demanded during a turning acceleration and the µ-using efficiency of the turning outer front wheel is controlled so as to become smaller in comparison with the Busing efficiency of the other wheels.

A roll rigidity distribution is distributed larger to the rear wheels so that the load of a turning inner rear wheel is lowered in the case that a inward moment is demanded during a turning acceleration and the µ-using efficiency of the turning inner rear wheel is controlled so as to become smaller in comparison with the µ-using efficiency of the other wheels.

When a minimum each wheel using percentage in all the wheels becomes equal to or less than a reference value, in the case that the wheel becoming equal to or less than the reference value is a turning inner front wheel or a turning outer rear wheel, a roll rigidity distribution is distributed largely to the front wheels in correspondence to the each wheel using percentage, and in the case that the wheel becoming equal to or less than the reference value is a turning outer front wheel or a turning inner rear wheel, the roll rigidity distribution is distributed largely to the rear wheels in correspondence to the each wheel using percentage.

Further, in accordance with the invention, a vehicle motion control method comprises: controlling a µ-using efficiency in such a manner that a µ-using efficiency of a wheel in which a yaw moment in a reverse direction to a target yaw moment is generated becomes smaller in comparison with a µ-using efficiency of the other wheels, in the case of generating the yaw moment in the reverse direction in the wheel, at a time of generating a tire generating force in each of the wheels in the direction of a target vehicle body force comprising a target vehicle body longitudinal force and a target vehicle body transverse force.

In the vehicle motion control method in accordance with the invention, the vehicle motion may be controlled by utilizing the control content described in the vehicle motion control device mentioned above.

Further, in accordance with the invention, it may be constructed as a program causing a computer to execute a process including a using friction circle computing unit for computing the size of a using friction circle in each of wheels by multiplying the size of an each wheel friction circle indicating a maximum generating force in each of the wheel tires by a corrected previously computed each wheel using percentage; an each wheel generating force computing unit for computing the each wheel tire generating force and the each wheel using percentage indicating a rate with respect to an upper limit value of a μ-using efficiency in each of the wheels, on the basis of a target vehicle body force and moment indicating a target vehicle body longitudinal force, a target vehicle body transverse force and a target yaw moment, and the sizes of the using friction circle computed by the using friction circle computing means; and a control unit for controlling a vehicle motion in such a manner that the computed each wheel tire generating force is obtained on the basis of the computed each wheel tire generating force. Even in this case, the program may be constructed by utilizing the control content described in the vehicle motion control device mentioned above.

Effect of the Invention

As described above, in accordance with the invention, there may be obtained such an effect that the upper limit of the each wheel pausing efficiency may be minimized.

BRIEF DESCRIPTION OF THE DRAWINGS

FIG. 5A is a schematic view showing a tire generated distribution in the case that a lateral force 8000 N and a braking force 6000 N are demanded at a time of turning and braking on a high k road having a road surface μ=1.0, and in the case that a command value of a yaw moment is 0;

FIG. 5B is a schematic view showing a tire generated distribution in the case that a lateral force 8000 N and a braking force 6000 N are demanded at a time of turning and braking on a high μ road having a road surface μ=1.0, and in the case that an outward yaw moment command is generated; and FIG. 5C is a schematic view showing a tire generated distribution in the case that a lateral force 8000 N and a braking force 6000 N are demanded at a time of turning and braking on a high ti road having a road surface μ=1.0, and in the case that an outward yaw moment command is generated.

BEST MODE FOR CARRYING OUT THE INVENTION

A description will be in detail given below of an exemplary embodiment in accordance with the present invention with reference to the accompanying drawings. First, a description will be given of each of cooperative controls between a steering and a braking and between the steering and a driving in a vehicle which may carry out the steering and the braking, and the steering and the driving independently in four wheels, that is, a principle of an integrated control.

Figure 1:
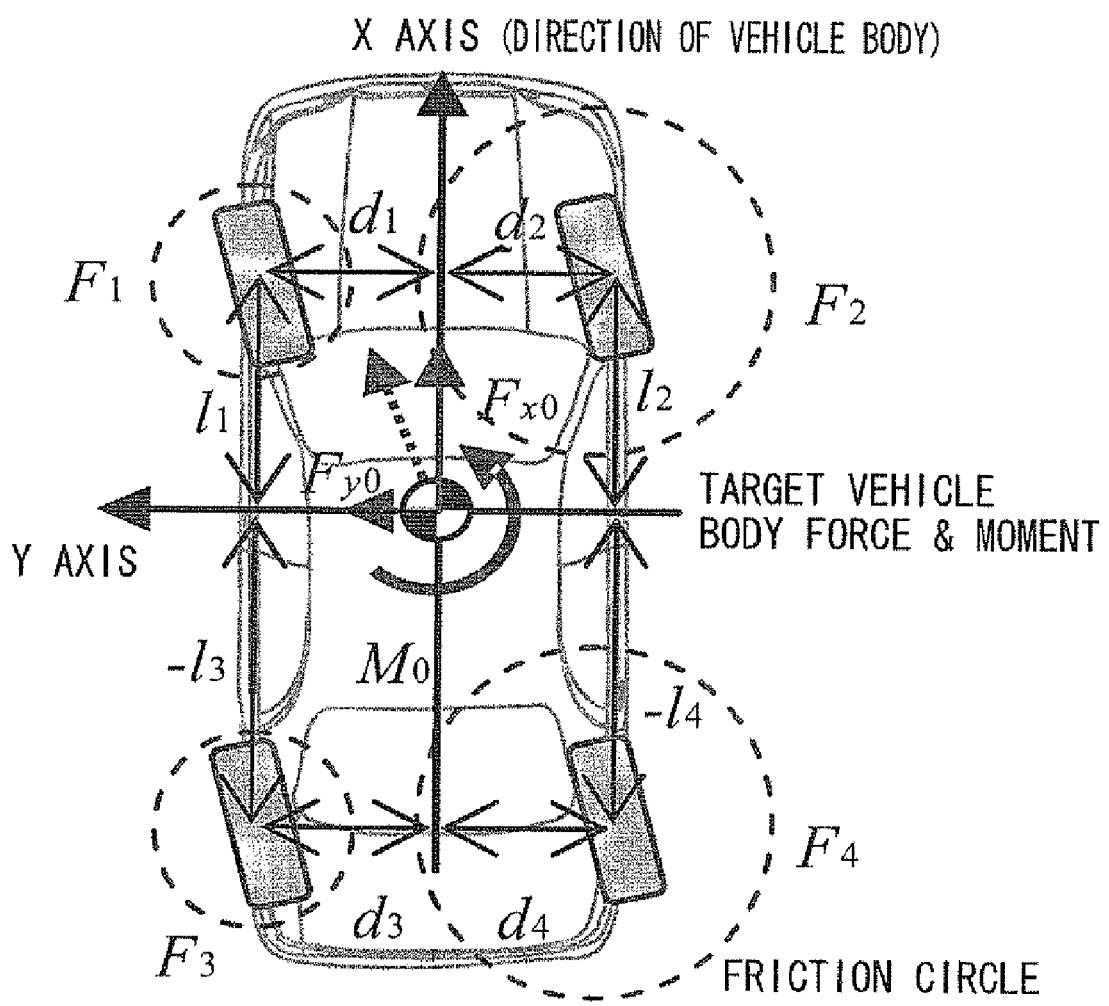
FIG. 1 is a schematic view showing a vehicle motion model.

First, a description will be given of a force applied as a resultant force of tire generating forced generated respectively in four wheels for obtaining a vehicle body motion desired by a driver to a vehicle body, by using a four-wheel vehicle motion model expressed by a general coordinate system in which a direction of a vehicle body longitudinal axis is set to an x axis, as shown in FIG. 1.

In this case, on the assumption that a size $F_i$ (in this case, i=1, 2, 3, 4, 1: left front wheel, 2: right front wheel, 3: left rear wheel, 4: right rear wheel) of a friction circle in each of the wheels (an each wheel friction circle) is known, there is determined a direction of the each wheel tire generating force and a μ-using efficiency in each of the wheels for minimizing an upper limit value (a maximum value in four wheels) of the μ-using efficiency in each of the wheels, while securing a target vehicle body force (a longitudinal force $F_{x0}$ a lateral force $F_{y0}$) and a target yaw moment $M_{z0}$ (a target vehicle body force and moment). In this case, the size of the friction circle in each of the wheels may be expressed by a size of the maximum generating force in each of the wheel tires, and may be estimated from a load in each of the wheels (an each wheel load), a wheel speed and a self aligning torque in each of the wheels, or the like. Further, the μ-using efficiency is an index expressing how the friction force is utilized with respect to a maximum friction force which may be generated in a friction between the tire and the road surface, and is expressed by a ratio of the tire generating force with respect to the friction circle of the wheel.

First, there is carried out a modeling of a constraint condition that a target vehicle body resultant force and a target yaw moment are secured (a target vehicle body force and moment are secured). A position $(x, y)=(l_i, d_i)$ of each of the tires may be expressed by the following formulas (1) to (8) as shown in FIG. 1, by converting into a coordinate space in which a direction of the tire generated resultant force is set to x axis, and a direction perpendicular to the x axis is set to y axis.

[Formula 1]

$$l_1 = L_f \quad (1)$$

$$l_2 = L_f \quad (2)$$

$$l_3 = -L_r \quad (3)$$

$$l_4 = -L_r \quad (4)$$

$$d_1 = \frac{T_f}{2} \quad (5)$$

$$d_2 = -\frac{T_f}{2} \quad (6)$$

$$d_3 = \frac{T_r}{2} \quad (7)$$

$$d_4 = -\frac{T_r}{2} \quad (8)$$

In this case, reference symbol $T_f$ denotes an interval between front wheels, reference symbol $T_r$ denotes an interval between rear wheels, reference symbol $L_f$ denotes a distance from a center of gravity of a vehicle to a middle point between the front wheels, reference symbol $L_T$ denotes a distance from the center of gravity of the vehicle to a middle point between the rear wheels, reference symbol $l_i$ denotes a distance from the x axis to a tire ground point, and reference symbol $d_i$ denotes a distance from the y axis to the tire ground point, respectively.

Further, on the assumption that an upper limit of the pausing efficiency in each of the wheels (the each wheel μ-using efficiency) is set to γ, the each wheel using percentage indicating a ratio of the μ-using efficiency in each of the wheels with respect to the upper limit γ of the μ-using efficiency is set to $r_i$, and the tire generating force direction in each of the wheels is set to $q_i$ (a counterclockwise direction with respect to the x axis is assumed to be positive), a tire generating force ($F_{xi}$, $F_{yi}$) in each of the wheels may be described as the following formulas (9) and (10).

[Formula 2]

$$F_{xi} = \gamma r_i F_i \cos q_i \quad (9)$$

$$F_{yi} = \gamma r_i F_i \sin q_i \quad (10)$$

Further, the vehicle body force (the longitudinal force $F_{x0}$, and the lateral force $F_{y0}$) corresponding to the resultant force of the tire generating force in each of the wheels (the each wheel tire generating force), and the yaw moment $M_{z0}$ may be described by the following constraint condition.

[Formula 3]

$$\gamma \sum_{i=1}^{4} r_i F_i \cos q_i = F_{x0} \quad (11)$$

$$\gamma \sum_{i=1}^{4} r_i F_i \sin q_i = F_{y0} \quad (12)$$

$$\gamma \sum_{i=1}^{4} r_i F_i (-d_i \cos q_i + l_i \sin q_i) = M_{z0} \quad (13)$$

In this case, the following formula (14) in which the upper limit γ of the μ-using efficiency is eliminated may be obtained by subtracting a formula multiplying both sides of the formula (12) by the longitudinal force $F_{x0}$ from an formula multiplying both sides of the formula (11) mentioned above by the lateral force $F_{y0}$.

[Formula 4]

$$-F_{y0} \sum_{i=1}^{4} r_i F_i \cos q_i + F_{x0} \sum_{i=1}^{4} r_i F_i \sin q_i = 0 \quad (14)$$

Further, the following formula (15) in which the upper limit γ of the μ-using efficiency is eliminated may be obtained by subtracting a formula multiplying both sides of the formula (13) by the longitudinal force $F_{x0}$ from an formula multiplying both sides of the formula (11) mentioned above by the moment $M_{z0}$.

[Formula 5]

$$-M_{z0} \sum_{i=1}^{4} r_i F_i \cos q_i + F_{x0} \sum_{i=1}^{4} r_i F_i (-d_i \cos q_i + l_i \sin q_i) = 0 \quad (15)$$

Further, the following formula (16) in which the upper limit γ of the μ-using efficiency is eliminated may be obtained by subtracting a formula multiplying both sides of the formula (13) by the lateral force $F_{y0}$ from an formula multiplying both sides of the formula (12) mentioned above by the yaw moment $M_{z0}$.

[Formula 6]

$$-M_{z0} \sum_{i=1}^{4} r_i F_i \sin q_i + F_{y0} \sum_{i=1}^{4} r_i F_i (-d_i \cos q_i + l_i \sin q_i) = 0 \quad (16)$$

Further, the following formula (17) may be obtained by adding both sides of the formulas (14) to (16) mentioned above in which the upper limit y of the μ-using efficiency is eliminated.

[Formula 7]

$$\sum_{i=1}^{4} r_i F_i \left\{ \begin{array}{l} (-d_i F_{x0} - d_i F_{y0} - F_{y0} - M_{z0}) \cos q_i + \\ (l_i F_{x0} + l_i F_{y0} + F_{x0} - M_{z0}) \sin q_i \end{array} \right\} = 0 \quad (17)$$

Further, the following formula (18) may be obtained by adding three formulas obtained by multiplying both sides of the formula (11) by $d_0^2 F_{x0}$, multiplying both sides of the formula (12) by $l_0^2 F_{y0}$, and multiplying both sides of the formula (13) by $M_{z0}$, respectively.

[Formula 8]

$$\gamma \sum_{i=1}^{4} r_i F_i \left\{ \begin{array}{l} (d_0^2 F_{x0} - d_i M_{z0}) \cos q_i + \\ (l_0^2 F_{y0} + l_i M_{z0}) \sin q_i \end{array} \right\} = (d_0 F_{x0})^2 + (l_0 F_{y0})^2 + M_{z0}^2 \quad (18)$$

In this case, reference symbols $d_0$ and $I_0$ denote constants for harmonizing a dimension of the force with a dimension of the moment. In the present exemplary embodiment, the reference symbols $d_0$ and $I_0$ are respectively set as the following formulas (19) and (20).

[Formula 9]

$$d_0 = \frac{T_f + T_r}{4} \quad (19)$$

$$l_0 = \frac{L_f + L_r}{2} \quad (20)$$

In this case, the size $M_{F0}$ of the target vehicle body force and moment the target vehicle body force & moment) are defined as the following formula (21).

[Formula 10]

$$M_{F0} = \sqrt{(d_0 F_{x0})^2 + (l_0 F_{y0})^2 + M_{z0}^2} \qquad (21)$$

Further, a constraint condition of the following formulas (22) and (23) in which the upper limit $\gamma$ of the $\mu$-using efficiency is eliminated from the formulas (13) and (18), and which is standardized by the size $M_{F0}$ of the target vehicle body force and moment are utilized.

[Formula 11]

$$\sum_{i=1}^{4} r_i F_i \left( \begin{array}{c} \dfrac{-d_i F_{x0} - d_i F_{y0} - F_{y0} - M_{z0}}{M_{F0}} \cos q_i + \\ \dfrac{l_i F_{x0} + l_i F_{y0} + F_{x0} - M_{z0}}{M_{F0}} \sin q_i \end{array} \right) = 0 \qquad (22)$$

$$\sum_{i=1}^{4} r_i F_i \left\{ \begin{array}{c} \dfrac{M_{z0}(d_0^2 F_{x0} - d_i M_{z0}) + d_i M_{F0}^2}{M_{F0}^2} \cos q_i + \\ \dfrac{M_{z0}(l_0^2 F_{y0} + l_i M_{z0}) - l_i M_{F0}^2}{M_{F0}^2} \sin q_i \end{array} \right\} = 0 \qquad (23)$$

In the ease of the constraint condition of the formulas (22) and (23) mentioned above, they may serve as the constraint condition even in the case that any two of $F_{x0}$, $F_{y0}$ and $M_{z0}$ come to 0. In this case, the standardization is executed for improving a computing precision at a time of carrying out a fixed point arithmetic by using a computer such as an ECU or the like and a program.

In this case, an evaluation function J aiming at minimization of the upper limit $\gamma$ of the $\mu$-using efficiency is defined as the following formula (24).

[Formula 12]

$$J = \frac{(d_0 F_{x0})^2 + (l_0 F_{y0})^2 + M_{z0}^2}{\gamma} = \frac{M_{F0}^2}{\gamma} \qquad (24)$$

The evaluation function is expressed by (constant)/(upper limit $\gamma$ of $\mu$-using efficiency), and the maximization of the formula (24) means the minimization of the $\mu$-using efficiency. Further, the evaluation function may be expressed by the following formula (25) by substituting the formula (18) mentioned above for the formula (24) mentioned above.

[Formula 13]

$$J = \frac{(d_0 F_{x0})^2 + (l_0 F_{y0})^2 + M_{z0}^2}{\gamma} \qquad (25)$$

$$= \sum_{i=1}^{4} r_i F_i \{(d_0^2 F_{x0} - d_i M_{z0}) \cos q_i + (l_0^2 F_{y0} + l_i M_{z0}) \sin q_i\}$$

As a result, the upper limit $\gamma$ of the $\mu$-using efficiency may be minimized by determining the tire generating force direction $q_i$ in each of the wheels maximizing the formula (25) mentioned above, and the each wheel using percentage $r_i$ with respect to the upper limit $\gamma$ of the $\mu$-using efficiency.

Accordingly, formulation may be carried out as shown in the following problem 1, as a nonlinear optimization problem.

Problem 1: determine the tire generating force direction $q_i$ in each of the wheels and the each wheel using percentage $r_i$ which satisfy the constraint condition of the formula (22) and the formula (23) and maximize the formula (25).

Next, a description will be given of an each wheel tire generating force distribution algorithm. In addition to the problem of the prior art in which the $\mu$-using efficiency in each of the wheels is uniformly set, in the present exemplary embodiment, it is necessary to include the each wheel using percentage $r_i$ in the parameter. In the present exemplary embodiment, the generating force direction $q_i$ in each of the wheels and the each wheel using percentage $r_i$ are determined by repeatedly computing by using the algorithm optimizing the generating force direction $q_i$ in each of the wheels and the each wheel using percentage $r_i$ individually each time.

In order to carry out a search on a $\mu$-using efficiency fixed friction circle, the generating force direction $q_i$ in each of the wheels is first derived by utilizing an algorithm of a sequential quadratic programming method in the same manner as the prior art, in a state of fixing the each wheel using percentage $r_i$.

The constraint condition of the formulas (22) and (23) mentioned above may be linearized with regard to the generating force direction $q_i$ in each of the wheels as shown by the following formulas (28) and (29), by primary approximating $\sin q_i$ and $\cos q_i$ as shown by the following formulas (26) and (27).

[Formula 14]

$$\sin q_i = \sin q_{i0} + \cos q_{i0}(q_i - q_{i0}) \qquad (26)$$

$$\cos q_i = \cos q_{i0} - \sin q_{i0}(q_i - q_{i0}) \qquad (27)$$

$$\sum_{i=1}^{4} r_i F_i \left( \begin{array}{c} \dfrac{d_i F_{x0} + d_i F_{y0} + F_{y0} + M_{z0}}{M_{F0}} \sin q_{i0} + \\ \dfrac{l_i F_{x0} + l_i F_{y0} + F_{x0} - M_{z0}}{M_{F0}} \cos q_{i0} \end{array} \right) q_i = \qquad (28)$$

$$\sum_{i=1}^{4} r_i F_i \left\{ \begin{array}{c} \dfrac{d_i F_{x0} + d_i F_{y0} + F_{y0} + M_{z0}}{M_{F0}} (q_{i0} \sin q_{i0} + \cos q_i) + \\ \dfrac{l_i F_{x0} + l_i F_{y0} + F_{x0} - M_{z0}}{M_{F0}} (q_{i0} \cos q_{i0} - \sin q_{i0}) \end{array} \right\}$$

$$\sum_{i=1}^{4} r_i F_i \left\{ \begin{array}{c} -\dfrac{M_{z0}(d_0^2 F_{x0} - d_i M_{z0}) + d_i M_{F0}^2}{M_{F0}^2} \sin q_{i0} + \\ \dfrac{M_{z0}(l_0^2 F_{y0} + l_i M_{z0}) - l_i M_{F0}^2}{M_{F0}^2} \cos q_{i0} \end{array} \right\} q_i \qquad (29)$$

$$\sum_{i=1}^{4} r_i F_i \left\{ \begin{array}{c} -\dfrac{M_{z0}(d_0^2 F_{x0} - d_i M_{z0}) + d_i M_{F0}^2}{M_{F0}^2} \sin q_{i0} + \\ \dfrac{M_{z0}(l_0^2 F_{y0} + l_i M_{z0}) - l_i M_{F0}^2}{M_{F0}^2} \cos q_{i0} \end{array} \right\} q_i =$$

$$\sum_{i=1}^{4} r_i F_i \left\{ \begin{array}{c} -\dfrac{M_{z0}(d_0^2 F_{x0} - d_i M_{z0}) + d_i M_{F0}^2}{M_{F0}^2} (q_{i0} \sin q_{i0} + \cos q_i) + \\ \dfrac{M_{z0}(l_0^2 F_{y0} + l_i M_{z0}) - l_i M_{F0}^2}{M_{F0}^2} (q_{i0} \cos q_{i0} - \sin q_{i0}) \end{array} \right\}$$

Further, if $\sin q_i$ and $\cos q_i$ are approximated as shown in the following formulas (30) and (31) in accordance with a secondary Taylor expansion, the evaluation function J of the formula (25) mentioned above may be described by the following formula (32).

[Formula 15]

$$\sin q_i = \sin q_{i0} + \cos q_{i0}(q_i - q_{i0}) - \frac{\sin q_{i0}}{2}(q_i - q_{i0})^2 \quad (30)$$

$$\cos q_1 = \cos q_{i0} - \sin q_{i0}(q_i - q_{i0}) - \frac{\cos q_{i0}}{2}(q_i - q_{i0})^2 \quad (31)$$

$$J = \sum_{i=1}^{4} r_i F_i \begin{bmatrix} -\frac{1}{2}\left\{\begin{array}{l}(d_0^2 F_{x0} - d_i M_{z0})\cos q_{i0} + \\ (l_0^2 F_{y0} + l_i M_{z0})\sin q_{i0}\end{array}\right\} q_i^2 + \\ \left\{\begin{array}{l}(d_0^2 F_{x0} - d_i M_{z0})(q_{i0}\cos q_{i0} - \sin q_{i0}) + \\ (l_0^2 F_{y0} + l_i M_{z0})(q_{i0}\sin q_{i0} + \cos q_{i0})\end{array}\right\} q_i + \\ (d_0^2 F_{x0} - d_i M_{z0})\left\{\left(1 - \frac{q_{i0}^2}{2}\right)\cos q_{i0} + q_{i0}\sin q_{i0}\right\} + \\ (l_0^2 F_{y0} + l_i M_{z0})\left\{\left(1 - \frac{q_{i0}^2}{2}\right)\sin q_{i0} - q_{i0}\cos q_{i0}\right\} \end{bmatrix} = \quad (32)$$

$$\sum_{i=1}^{4} r_i F_i \left\{ -\frac{1}{2} X_{Di}(q_i - X_i)^2 + Y_i \right\}$$

where $$X_i = \frac{X_{Ni}}{X_{Di}} \quad (33)$$

$$X_{Ni} = (d_0^2 F_{x0} - d_i M_{z0})(q_{i0}\cos q_{i0} - \sin q_{i0}) + \quad (34)$$
$$(l_0^2 F_{y0} + l_i M_{z0})(q_{i0}\sin q_{i0} + \cos q_{i0})$$

$$X_{Di} = (d_0^2 F_{x0} - d_i M_{z0})\cos q_{i0} + (l_0^2 F_{y0} + l_i M_{z0})\sin q_{i0} \quad (35)$$

$$Y_i = (d_0^2 F_{x0} - d_i M_{z0})\left\{\left(1 - \frac{q_{i0}^2}{2}\right)\cos q_{i0} + q_{i0}\sin q_{i0}\right\} + \quad (36)$$
$$(l_0^2 F_{y0} + l_i M_{z0})\left\{\left(1 - \frac{q_{i0}^2}{2}\right)\sin q_{i0} - q_{i0}\cos q_{i0}\right\} + \frac{X_{Ni}^2}{2 X_{Di}}$$

Further, the evaluation function J of the formula (25) mentioned above may be expressed as shown by the following formula (38), by carrying out a variable conversion shown by the following formula (37), and is converted into an Euclidean norm minimization problem of p.

[Formula 16]

$$p_i = \sqrt{r_i F_i X_{Di}}(q_i - X_i) \quad (37)$$

$$J = \sum_{i=1}^{4}\left(-\frac{1}{2}p_i^2 + r_i F_i Y_i\right) = -\frac{1}{2}\|p\|^2 + \sum_{i=1}^{4} r_i F_i Y_i \quad (38)$$

where
$$p = [\, p_1 \ p_2 \ p_3 \ p_4 \,]^T$$

Further, the linearly approximated constraint condition may be described by the following formula (39).

[Formula 17]

$$\begin{bmatrix} A_{11} & A_{12} & A_{13} & A_{14} \\ A_{21} & A_{22} & A_{23} & A_{24} \end{bmatrix} p = \begin{bmatrix} B_1 \\ B_2 \end{bmatrix} \quad (39)$$

where $$A_{1i} = \sqrt{\frac{r_i F_i}{X_{Di}}} \cdot \left( \frac{d_i F_{x0} + d_i F_{y0} + F_{y0} + M_{z0}}{M_{F0}}\sin q_{i0} + \frac{l_i F_{x0} + l_i F_{y0} + F_{x0} - M_{z0}}{M_{F0}}\cos q_{i0} \right) \quad (40)$$

$$A_{2i} = \sqrt{\frac{r_i F_i}{X_{Di}}} \cdot \left\{ -\frac{M_{z0}(d_0^2 F_{x0} - d_i M_{z0}) + d_i M_{F0}^2}{M_{F0}^2}\sin q_{i0} + \frac{M_{z0}(l_0^2 F_{y0} + l_i M_{z0}) - l_i M_{F0}^2}{M_{F0}^2}\cos q_{i0} \right\} \quad (41)$$

$$B_1 = \sum_{i=1}^{4} r_i F_i \begin{bmatrix} d_i F_{x0} + d_i F_{y0} + \\ \frac{F_{y0} + M_{z0}}{M_{F0}}\left\{\begin{array}{l}(q_{i0} - X_i)\sin q_{i0} + \\ \cos q_{i0}\end{array}\right\} + \\ l_i F_{x0} + l_i F_{y0} + \\ \frac{F_{x0} - M_{z0}}{M_{F0}}\left\{\begin{array}{l}(q_{i0} - X_i)\cos q_{i0} - \\ \sin q_{i0}\end{array}\right\} \end{bmatrix} \quad (42)$$

$$B_2 = \sum_{i=1}^{4} r_i F_i \begin{bmatrix} M_{z0}(d_0^2 F_{x0} - d_i M_{z0}) + \\ -\frac{d_i M_{F0}^2}{M_{F0}^2}\left\{\begin{array}{l}(q_{i0} - X_i)\sin q_{i0} + \\ \cos q_{i0}\end{array}\right\} + \\ M_{z0}(l_0^2 F_{y0} + l_i M_{z0}) - \\ \frac{l_i M_{F0}^2}{M_{F0}^2}\left\{\begin{array}{l}(q_{i0} - X_i)\cos q_{i0} - \\ \sin q_{i0}\end{array}\right\} \end{bmatrix} \quad (43)$$

An Euclidean norm minimum solution satisfying the formula (39) mentioned above may be determined as shown by the following formula (44).

[Formula 18]

$$p = \begin{bmatrix} A_{11} & A_{12} & A_{13} & A_{14} \\ A_{21} & A_{22} & A_{23} & A_{24} \end{bmatrix}^{+} \cdot \begin{bmatrix} B_1 \\ B_2 \end{bmatrix} \quad (44)$$

In this case, $A^+$ is a pseudo-inverse matrix of a matrix A.

As a result, q expressing the tire generating force direction in each of the wheels may be expressed by the following formula (45).

[Formula 19]

$$q = \operatorname{diag}\left[ \frac{1}{\sqrt{r_1 F_1 X_{D1}}} \ \frac{1}{\sqrt{r_2 F_2 X_{D2}}} \ \frac{1}{\sqrt{r_3 F_3 X_{D3}}} \ \frac{1}{\sqrt{r_4 F_4 X_{D4}}} \right] \cdot \quad (45)$$

$$\left( \begin{bmatrix} A_{11} & A_{12} & A_{13} & A_{14} \\ A_{21} & A_{22} & A_{23} & A_{24} \end{bmatrix}^{+} \cdot \begin{bmatrix} B_1 \\ B_2 \end{bmatrix} + \begin{bmatrix} X_1 \\ X_2 \\ X_3 \\ X_4 \end{bmatrix} \right)$$

In this case, reference symbol diag denotes a diagonal matrix. Further, q may be expressed by the following formula using the each wheel tire generating force direction $q_i$ (=$q_1$, $q_2$, $q_3$, $q_4$).

[Formula 20]

$$q = [q_1 q_2 q_3 q_4]^T$$

In this case, a penalty function P in the following formula (46) described by using a positive constant ρ (=1.0) is defined.

[Formula 21]

$$P = \frac{1}{J} + \rho(|J_1| + |J_2|) \quad (46)$$

where $$J_1 = \sum_{i=1}^{4} r_i F_i \left( \frac{-d_i F_{x0} - d_i F_{y0} - F_{y0} - M_{z0}}{M_{F0}} \cos q_i + \frac{l_i F_{x0} + l_i F_{y0} + F_{x0} - M_{z0}}{M_{F0}} \sin q_i \right) \quad (47)$$

$$J_2 = \sum_{i=1}^{4} r_i F_i \left\{ -\frac{M_{z0}(d_0^2 F_{x0} - d_i M_{z0}) + d_i M_{F0}^2}{M_{F0}^2} \cos q_i + \frac{M_{z0}(l_0^2 F_{y0} + l_i M_{z0}) - l_i M_{F0}^2}{M_{F0}^2} \sin q_i \right\} \quad (48)$$

In the case that the penalty function of the formula (46) mentioned above is computed by using the each wheel tire generating force direction $q_i$ derived by the formula (45) mentioned above, and the penalty function P is reduced, a convergence computation is carried out in accordance with a recursive method repeatedly executing the computation of the formulas (33) to (35), the formulas (40) to (43) and the formula (45) again.

Further, the μ-using efficiency in the case of utilizing the each wheel tire generating force direction $q_i$ derived by the algorithm may be computed by the following formula (49) derived from the formulas (24) and (28) mentioned above. As is understood from the formula (49), the μ-using efficiency is expressed by a ratio of two squares of the sizes of the target vehicle body force and moment with respect to the evaluation function.

[Formula 22]

$$\gamma = \frac{(d_0 F_{x0})^2 + (l_0 F_{y0})^2 + M_{z0}^2}{\sum_{i=1}^{4} r_i F_i \left\{ \begin{array}{c} (d_0^2 F_{x0} - d_i M_{z0}) \cos q_i + \\ (l_0^2 F_{y0} + l_i M_{z0}) \sin q_i \end{array} \right\}} \quad (49)$$

Next, a description will be given of a correction of the each wheel using percentage. When the each wheel using percentage is corrected by changing the each wheel using percentage $r_i$ ($=r_1, r_2, r_3, r_4$) with respect to the upper limit γ of the μ-using efficiency in each of the wheels to $r_i + dr_i$ ($dr_i$ is a change amount), the formulas (22) and (23) expressing the constraint condition of the target vehicle body force and moment may be expressed by the following formulas (50) and (51).

[Formula 23]

$$\sum_{i=1}^{4} r_i F_i \left( \frac{-d_i F_{x0} - d_i F_{y0} - F_{y0} - M_{z0}}{M_{F0}} \cos q_i + \frac{l_i F_{x0} + l_i F_{y0} + F_{x0} - M_{z0}}{M_{F0}} \sin q_i \right) = \Delta_1(dr) \quad (50)$$

$$\sum_{i=1}^{4} r_i F_i \left\{ \frac{M_{z0}(d_0^2 F_{x0} - d_i M_{z0}) + d_i M_{F0}^2}{M_{F0}} \cos q_i + \frac{M_{z0}(l_0^2 F_{y0} + l_i M_{z0}) - l_i M_{F0}^2}{M_{F0}^2} \sin q_i \right\} = \Delta_2(dr) \quad (51)$$

-continued $$\Delta_1(dr) = -\sum_{i=1}^{4} dr_i F_i \left( \frac{-d_i F_{x0} - d_i F_{y0} -}{M_{F0}} \frac{F_{y0} - M_{z0}}{M_{F0}} \cos q_i + \frac{l_i F_{x0} + l_i F_{y0} +}{M_{F0}} \frac{F_{x0} - M_{z0}}{M_{F0}} \sin q_i \right) \quad (52)$$

$$\Delta_2(dr) = -\sum_{i=1}^{4} dr_i F_i \left\{ \frac{M_{z0}(d_0^2 F_{x0} - d_i M_{z0}) +}{M_{F0}^2} \frac{d_i M_{F0}^2}{M_{F0}^2} \cos q_i + \frac{M_{z0}(l_0^2 F_{y0} + l_i M_{z0}) -}{M_{F0}^2} \frac{l_i M_{F0}^2}{M_{F0}^2} \sin q_i \right\} \quad (53)$$

Accordingly, since the each wheel tire generating force direction $q_i$ and the evaluation function are changed by changing the each wheel using percentage $r_i$, it is necessary to correct q in the formula (45), for example, to q+dq, in order to satisfy the constraint condition of the target vehicle body force and moment at a time of changing the each wheel using percentage $r_i$ to $r_i+dr_i$. In this case, the change amount dq of q expressing the each wheel tire generating force direction is expressed by the following formula (54).

[Formula 24]

$$dq = \text{diag}\left[ \frac{1}{\sqrt{r_1 F_1 X_{D1}}} \quad \frac{1}{\sqrt{r_2 F_2 X_{D2}}} \quad \frac{1}{\sqrt{r_3 F_3 X_{D3}}} \quad \frac{1}{\sqrt{r_4 F_4 X_{D4}}} \right] \cdot \begin{bmatrix} A_{11} & A_{12} & A_{13} & A_{14} \\ A_{21} & A_{22} & A_{23} & A_{24} \end{bmatrix}^+ \cdot \begin{bmatrix} \Delta_1(dr) \\ \Delta_2(dr) \end{bmatrix} \quad (54)$$

In this case, dq may be expressed by the following formula on the basis of the change amount $dq_i$ ($=dq_1, dq_2, dq_3, dq_4$) of the each wheel tire generating force direction.

$$d_q = [dq_1 dq_2 dq_3 dq_4]^T$$

This case takes into consideration only satisfying the constraint condition of the target vehicle body force and moment, the correction is not fixed. In other words, infinitude of correcting methods may be provided, however, the present exemplary embodiment employs a correcting method utilizing the derived pseudo-inverse matrix as it is, for simplifying the computation. In this case, the evaluation function J of the formula (25) mentioned above is changed to J+dJ. In this case, the change amount dJ may be expressed by the following formula (55).

[Formula 25]

$$dJ = \sum_{i=1}^{4} \left[ \begin{array}{c} dr_i F_i \left\{ \begin{array}{c} (d_0^2 F_{x0} - d_i M_{z0}) \cos q_i + \\ (l_0^2 F_{y0} + l_i M_{z0}) \sin q_i \end{array} \right\} + \\ r_i F_i \left\{ \begin{array}{c} -(d_0^2 F_{x0} - d_i M_{z0}) \sin q_i + \\ (l_0^2 F_{y0} + l_i M_{z0}) \cos q_i \end{array} \right\} dq_i \end{array} \right] \quad (55)$$

Accordingly, the change amount dJ of the evaluation function J may be expressed by the following formula (56) obtained by partially differentiating the evaluation function J approximately.

[Formula 26]

$$\frac{\partial J}{\partial r} \cong \begin{bmatrix} F_1\{(d_0^2 F_{x0} - d_1 M_{z0})\cos q_1 + \\ (l_0^2 F_{y0} + l_1 M_{z0})\sin q_1\} \\ F_2\{(d_0^2 F_{x0} - d_2 M_{z0})\cos q_2 + \\ (l_0^2 F_{y0} + l_2 M_{z0})\sin q_2\} \\ F_3\{(d_0^2 F_{x0} - d_3 M_{z0})\cos q_3 + \\ (l_0^2 F_{y0} + l_3 M_{z0})\sin q_3\} \\ F_4\{(d_0^2 F_{x0} - d_4 M_{z0})\cos q_4 + \\ (l_0^2 F_{y0} + l_i M_{z0})\sin q_4\} \end{bmatrix} + \qquad (56)$$

$$\left(\text{diag}\begin{bmatrix} \frac{1}{\sqrt{r_1 F_1 X_{D1}}} & \frac{1}{\sqrt{r_2 F_2 X_{D2}}} \\ \frac{1}{\sqrt{r_3 F_3 X_{D3}}} & \frac{1}{\sqrt{r_4 F_4 X_{D4}}} \end{bmatrix}^T \cdot \begin{bmatrix} A_{11} & A_{12} & A_{13} & A_{14} \\ A_{21} & A_{22} & A_{23} & A_{24} \end{bmatrix}^+ \cdot \begin{bmatrix} D_{11} & D_{12} & D_{13} & D_{14} \\ D_{21} & D_{22} & D_{23} & D_{24} \end{bmatrix}\right)$$

$$\begin{bmatrix} r_1 F_1\{(d_0^2 F_{x0} - d_1 M_{z0})\sin q_1 + \\ (l_0^2 F_{y0} + l_1 M_{z0})\cos q_1\} \\ r_2 F_2\{(d_0^2 F_{x0} - d_2 M_{z0})\sin q_2 + \\ (l_0^2 F_{y0} + l_2 M_{z0})\cos q_2\} \\ r_3 F_3\{(d_0^2 F_{x0} - d_3 M_{z0})\sin q_3 + \\ (l_0^2 F_{y0} + l_3 M_{z0})\cos q_3\} \\ r_4 F_4\{(d_0^2 F_{x0} - d_4 M_{z0})\sin q_4 + \\ (l_0^2 F_{y0} + l_i M_{z0})\cos q_4\} \end{bmatrix} =$$

$$\begin{bmatrix} F_1\{(d_0^2 F_{x0} - d_1 M_{z0})\cos q_1 + \\ (l_0^2 F_{y0} + l_1 M_{z0})\sin q_1\} \\ F_2\{(d_0^2 F_{x0} - d_2 M_{z0})\cos q_2 + \\ (l_0^2 F_{y0} + l_2 M_{z0})\sin q_2\} \\ F_3\{(d_0^2 F_{x0} - d_3 M_{z0})\cos q_3 + \\ (l_0^2 F_{y0} + l_3 M_{z0})\sin q_3\} \\ F_4\{(d_0^2 F_{x0} - d_4 M_{z0})\cos q_4 + \\ (l_0^2 F_{y0} + l_i M_{z0})\sin q_4\} \end{bmatrix} +$$

$$\left(\begin{bmatrix} A_{11} & A_{12} & A_{13} & A_{14} \\ A_{21} & A_{22} & A_{23} & A_{24} \end{bmatrix}^+ \cdot \begin{bmatrix} D_{11} & D_{12} & D_{13} & D_{14} \\ D_{21} & D_{22} & D_{23} & D_{24} \end{bmatrix}\right)^T \cdot$$

$$\begin{bmatrix} \sqrt{\frac{r_1 F_1}{X_{D1}}}\{-(d_0^2 F_{x0} - d_1 M_{z0})\sin q_1 + \\ (l_0^2 F_{y0} + l_1 M_{z0})\cos q_1\} \\ \sqrt{\frac{r_2 F_2}{X_{D2}}}\{-(d_0^2 F_{x0} - d_2 M_{z0})\sin q_2 + \\ (l_0^2 F_{y0} + l_2 M_{z0})\cos q_2\} \\ \sqrt{\frac{r_3 F_3}{X_{D3}}}\{-(d_0^2 F_{x0} - d_3 M_{z0})\sin q_3 + \\ (l_0^2 F_{y0} + l_3 M_{z0})\cos q_3\} \\ \sqrt{\frac{r_4 F_4}{X_{D4}}}\{-(d_0^2 F_{x0} - d_4 M_{z0})\sin q_4 + \\ (l_0^2 F_{y0} + l_4 M_{z0})\cos q_4\} \end{bmatrix}$$

In this case, $D_{1i}$ and $D_{2i}$ are defined by the following formulas (57) and (58).

[Formula 27]

$$D_{1i} = -F_i \left( \frac{-d_i F_{x0} - d_i F_{y0} - F_{y0} - M_{z0}}{M_{F0}} \cos q_i + \frac{l_i F_{x0} + l_i F_{y0} + F_{x0} - M_{z0}}{M_{F0}} \sin q_i \right) \qquad (57)$$

$$D_{2i} = -F_i \left\{ \frac{M_{z0}(d_0^2 F_{x0} - d_i M_{z0}) + d_i M_{z0}^2}{M_{F0}} \cos q_i + \frac{M_{z0}(l_0^2 F_{y0} + l_i M_{z0}) - l_i M_{F0}^2}{M_{F0}^2} \sin q_i \right\} \qquad (58)$$

In the present exemplary embodiment, an inner point is searched by changing $r \, [r_1 r_2 r_3 r_4]^T)$ within a range between 0 and 1 as shown by the following formula (59) on the basis of a maximum grade method, and proceeding on to the next step of the repeated computation. In this case, reference symbol $r_0$ denotes a previous value of the each wheel using percentage r in the repeated computation, and reference symbol k denotes a positive constant. Accordingly, in the case that the evaluation function J is changed so as to become enlarged, the each wheel using percentage r is corrected so as to become smaller.

[Formula 28]

$$r = \begin{cases} 0 & \left(r_0 + k\frac{\partial J}{\partial r} < 0\right) \\ r_0 + k\frac{\partial J}{\partial r} & \left(0 \le r_0 k\frac{\partial J}{\partial r} \le 1\right) \\ 1 & \left(r_0 + k\frac{\partial J}{\partial r} > 1\right) \end{cases} \qquad (59)$$

At this time, q is corrected to q+dq so as to satisfy the constraint condition of the target vehicle body force and moment, in accordance with the change of the each wheel using percentage r. In this case, reference symbol dq may be expressed by the following formula (54) described above.

[Formula 29]                                                                 (54)

$$dq = \text{diag}\begin{bmatrix} \frac{1}{\sqrt{r_1 F_1 X_{D1}}} & \frac{1}{\sqrt{r_2 F_2 X_{D2}}} & \frac{1}{\sqrt{r_3 F_3 X_{D3}}} & \frac{1}{\sqrt{r_4 F_4 X_{D4}}} \end{bmatrix} \cdot \begin{bmatrix} A_{11} & A_{12} & A_{13} & A_{14} \\ A_{21} & A_{22} & A_{23} & A_{24} \end{bmatrix}^+ \cdot \begin{bmatrix} \Delta_1(dr) \\ \Delta_2(dr) \end{bmatrix}$$

In this case, the upper limit γ of the μ-using efficiency is computed on the basis of the formula (49) by using the angle $q_i$ derived as mentioned above.

Figure 2:
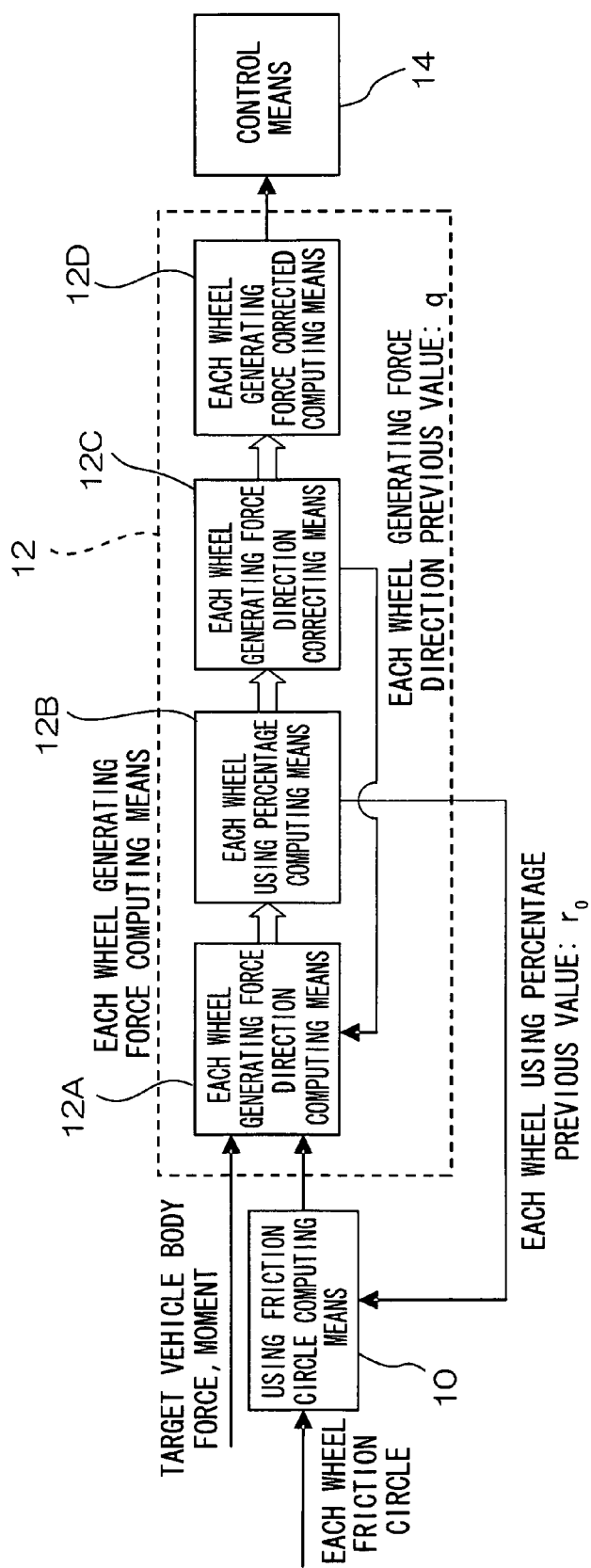
FIG. 2 is a block diagram of an exemplary embodiment in accordance with the invention.

Next, a description will be given of a specific structure of the present exemplary embodiment utilizing the principle mentioned above on the basis of FIG. 2. As shown in the drawing, the present exemplary embodiment is provided with a using friction circle computing means 10 computing a size of a using friction circle in each of the wheels expressed by a product $r_i F_i$ in the formulas (9) and (10), which multiplies the size $F_i$ of the each wheel friction circle corresponding to the maximum generating force in each of the wheel tires estimated on the basis of a wheel speed motion and a self aligning in each of the wheels and the previous value of the each wheel using percentage $r_i$ computed by a pre-step of the repeated computation.

The using friction circle computing means 10 is connected to an each wheel generating force computing means 12 computing the tire generating force in each of the wheels and the each wheel using percentage $r_i$ indicating the rate with respect to the upper limit $\gamma$ of the $\mu$-using efficiency in each of the wheels on the basis of the target vehicle body force and moment corresponding to the target value of the vehicle body longitudinal force, the vehicle body lateral force, and the yaw moment, and the size of the using friction circle. A control means 14 achieving the computed each wheel tire generating force in accordance with a vehicle integrated control is connected to the each wheel generating force computing means 12.

The each wheel generating force computing means 12 is provided with an each wheel generating force direction computing means 12A computing the direction $q_i$ of the each wheel tire generating force minimizing the upper limit value $\gamma$ of the j$\mu$-using efficiency under the constraint condition that the target vehicle body force and moment are achieved, from the target vehicle body force and moment, and the using friction circle in each of the wheels computed by the using friction circle computing means 10, on the basis of the formula (45) mentioned above.

The each wheel generating force direction computing means 12A connects to an each wheel using percentage computing means 12B computing the each wheel using percentage $r_i$ indicating the rate with respect to the upper limit value $\gamma$ of the $\mu$-using efficiency in each of the wheels in accordance with the formula (59) mentioned above in such a manner as to lower the upper limit value $\gamma$ of the $\mu$-using efficiency under the constraint condition that the target vehicle body force and moment are achieved. The each wheel using percentage computing means 12B changes the each wheel using percentage $r_i$ between 0 and 1, and changes so that the each wheel using percentage $r_i$ becomes smaller in the case that the evaluation function J is largely changed.

The each wheel using percentage computing means 12B is connected to the using friction circle computing means 10, and inputs the previous value in the repeated computation of the each wheel using percentage computed by the each wheel using percentage computing means 112B to the using friction circle computing means 10.

Further, the each wheel using percentage computing means 12B connects to an each wheel generating force direction correcting means 12C correcting the direction of the each wheel tire generating force in accordance with the formula (54) mentioned above, in correspondence to the each wheel using percentage, together with the computation of the each wheel using percentage, for achieving the target vehicle body force and moment.

The each wheel generating force direction correcting means 12C is connected to the each wheel generating force direction computing means 12A, and inputs the previous value of the each wheel tire generating force direction to the each wheel generating force direction computing means 12A.

The each wheel generating force direction correcting means 12C connects to an each wheel generating force corrected computing means 12D computing the generating force in each of the wheels on the basis of the each wheel using percentage after being corrected, the each wheel tire generating force direction after being corrected, and the minimized $\mu$-using efficiency upper limit value. The each wheel generating force computing means 12D computes the each wheel tire generating force $F_{xi}$, $F_{yi}$ in accordance with the formulas (9) and (10).

Next, a description will be given of a control of a braking and driving force and a steering force by the control means.

The braking and driving force in each of the wheels may be derived from the formula (9) indicating the longitudinal force $F_{xi}$ mentioned above, by using the $\mu$-using efficiency, the size $F_i$ of a critical friction circle in each of the wheels, and the direction $q_i$ of the resultant force. In this case, reference symbol $\gamma F_i$ denotes a size of the tire generating force.

Further, the lateral force $F_{yi}$ in each of the wheels may be derived from the formula (10) mentioned above in the same manner.

A steered angle in each of the wheels may be computed, for example, on the basis of a brush model and a vehicle motion model. The brush model is a model describing a tire generating force characteristic on the basis of a theoretical formula. Assuming that the tire generating force is generated in accordance with the brush model, a slip angle $\beta_i$ may be determined as follows on the basis of the size $F_i$ of the friction circle in each of the wheels, the $\mu$-using efficiency in each of the wheels, and the direction $q_i$ of the tire generating force in each of the wheels.

[Formula 30]

$$\beta_i = \tan^{-1}\left(\frac{K_s}{K_\beta} \cdot \frac{-k_i \sin(q_i)}{1 - k_i \cos(q_i)}\right) \tag{60}$$

where $$k_i = \frac{3F_i}{K_s}\left(1 - (1-\gamma)^{\frac{1}{3}}\right) \tag{61}$$

In this case, reference symbol $K_s$ denotes a driving stiffness, and reference symbol $K\beta$ denotes a cornering stiffness.

Further a steered angle at in each of the wheels is computed on the basis of the vehicle motion model from the slip angle. In other words, the steered angle $\delta_i$ in each of the wheels may be computed as shown by the following formulas (62) to (65) from a yaw angular velocity $r_0$ and a vehicle body slip angle $\beta_0$, which are computed as an aimed vehicle motion state amount on the basis of the vehicle speed v, the steered angle, an accelerator opening degree, a brake pedaling force and the like. In this case, reference symbols $\beta_1$ to $\beta_4$ denote a slip angle in each of the wheels in the formula (60) mentioned above.

[Formula 31]

$$\delta_1 = \beta_0 + \frac{L_f}{v}r_0 - \beta_1 \tag{62}$$

$$\delta_2 = \beta_0 + \frac{L_f}{v}r_0 - \beta_2 \tag{63}$$

$$\delta_3 = \beta_0 - \frac{L_r}{v}r_0 - \beta_3 \tag{64}$$

$$\delta_4 = \beta_0 - \frac{L_r}{v}r_0 - \beta_4 \tag{65}$$

In the case of carrying out a cooperation between a steering control and a braking and driving control, the braking and driving force in the formula (9) determined as mentioned above is set to a first operating amount, and the steered angle in the formulas (62) to (65) is set to a second operating amount. The braking force and the driving force are controlled on the basis of the first operating amount, and the steered angle, that is, the direction of the tire generating force is controlled on the basis of the second operating amount. In this case, the size of any one of the braking force and the driving force may be controlled, as well as the direction of the tire generating force is controlled.

In the case of executing the cooperation between the steering control and the braking and driving control on the basis of the control, the upper limit of the lμ-using efficiency may be always minimized, and a motion performance which has a maximum additional coverage with respect to a disturbance such as a road surface, a side wind or the like may be indicated.

Further, in the case of maximizing the resultant force to be applied to the vehicle body, the braking and driving force in each of the wheels may be determined by setting the μ-using efficiency in each of the wheels to 1 in the formula (9) mentioned above, and the steered angle in each of the wheels may be determined by in accordance with the formulas (57) to (60) by setting the μ-using efficiency to 1 in the formula (61) mentioned above.

Further, the driving force and the steered angle of the vehicle or the braking force and the steered angle are cooperatively controlled by setting the braking and driving force in each of the wheels and the steered angle in each of the wheels which are determined as mentioned above, to the operating amount.

In the case of the cooperative control, the control means controls a steering actuator and a braking and driving actuator, and controls the steered angle in each of the wheels which are necessary for achieving the target tire generating force in each of the wheels or the steered angle and the braking and driving force in each of the wheels.

As the control means 14, there may be used a braking force control means, a driving force control means, a front wheel steering control means or a rear wheel steering control means.

As the braking and driving control means, there is a control means which individually controls the braking force in each of the wheels independent from a driver operation, and is used for a so-called electronic stability control (ESC), or a control means (a so-called brake-by-wire) which is mechanically separated from the driver operation and optionally controls the braking force in each of the wheels via a signal line, or the like.

As the driving control means, there may be used a control means controlling the driving force by controlling a throttle opening degree, a phase lag of an ignition spark advance or a fuel injection amount, a control means controlling the driving force by controlling a shift position of a transmission, a control means controlling a driving force in at least one of a longitudinal direction and a lateral direction by controlling a torque transfer or the like.

As the front wheel steering control means, there may be used a control means controlling the steered angle of the front wheels and superposing a steering wheel operation of the driver, a control means (a so-called steer-by-wire) which is mechanically separated from the driver operation and controls the front wheel steered angle independently from the operation of the steering wheel or the like.

Further, as the rear wheel steering control means, there may be used a control means controlling the steered angle of the rear wheels in correspondence to the steering wheel operation of the driver, a control means which is mechanically separated from the driver operation and controls the rear wheel steered angle independently from the operation of the steering wheel.

In this case, the structure may be made such as to compute only the braking and driving force and control the driving force, the braking force or the braking and driving force. In other words, the structure may be made such as to control only the size of the tire generating force without controlling the steered angle.

There may be constructed the using friction circle computing means 10, the each wheel generating force computing means 12 (the each wheel generating force direction computing means 12A, the each wheel using percentage computing means 121, the each wheel generating force direction correcting means 12C and the each wheel generating force computing means 12D), and the control means 14 by one or a plurality of computers. In this case, a program for making the computer serve as each of the means mentioned above is stored in the computer.

Figure 3A:
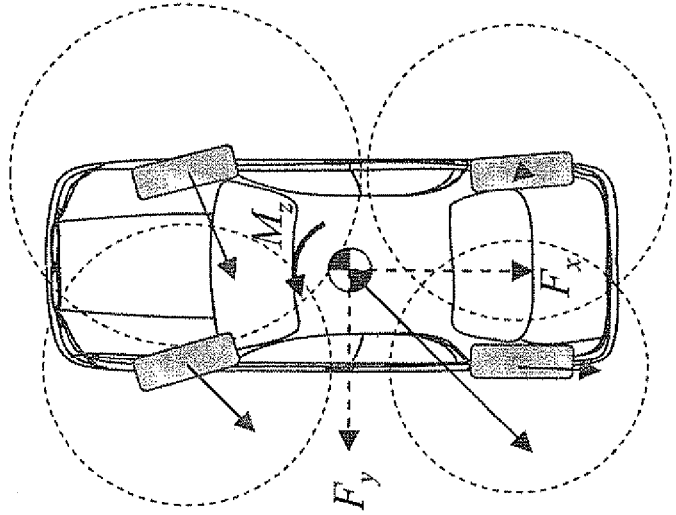
FIG. 3A is a schematic view showing a tire generating force and the like in each of wheels in a result of computation in the case that the each wheel using percentage $r_i$ is fixed to 1.
Figure 3B:
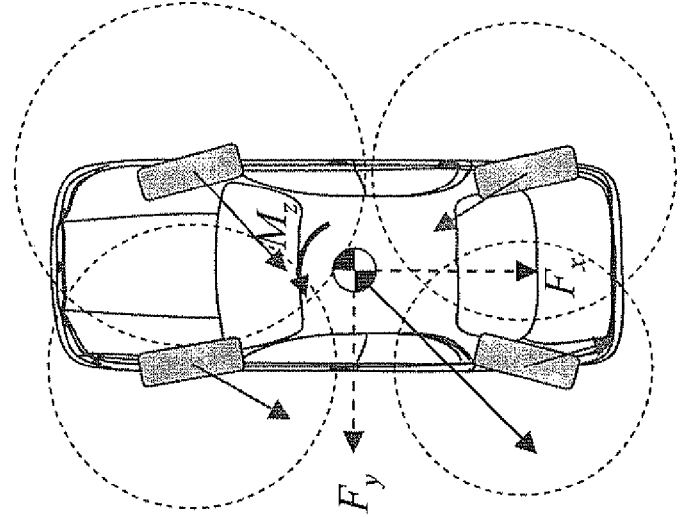
FIG. 3B is a schematic view showing a tire generating force and the like in each of wheels in a result of computation in accordance with the present exemplary embodiment.

Next, an effect of the exemplary embodiment mentioned above will be shown in comparison with a case that the each wheel using percentage $r_i$ is fixed to a relation $r_i=1$. FIGS. 3A and 3B show a result of simulation at a time of traveling on a medium μ road (road surface μ=0.5). This simulation utilizes an each wheel tire generating force computed value after executing a repeated computation of a recurrence formula seven times. In the case that the each wheel using percentage $r_i$ is fixed to the relation $r_i=1$ as shown in FIG. 3A, an adverse effect caused by uniformizing the μ-using efficiency, such as a cancellation of right and left wheel lateral forces of the rear wheels or the like, appears.

On the contrary the cancellation of the right and left wheel lateral forces in the rear wheels runs short by lowering the μ-using efficiency of the right rear wheel in the present exemplary embodiment, as shown in FIG. 3B.

Figure 4A:
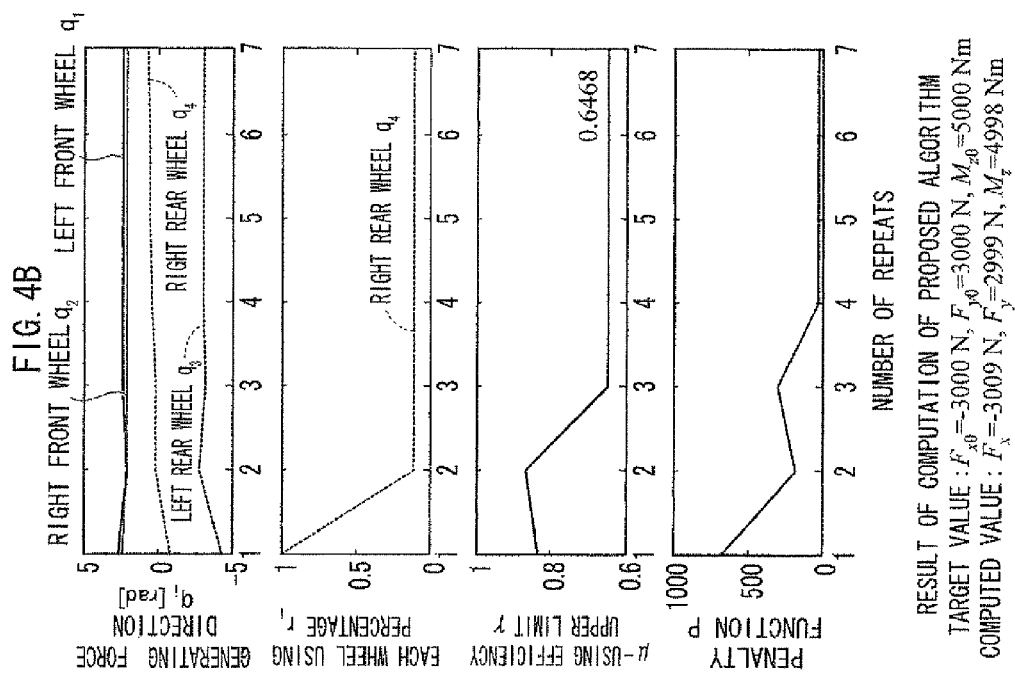
FIG. 4A is a schematic view showing a tire generating force direction and the like in each of the wheels per number of repeats in a result of computation in the case of fixing the each wheel using percentage $r_i$ to 1.
Figure 4B:
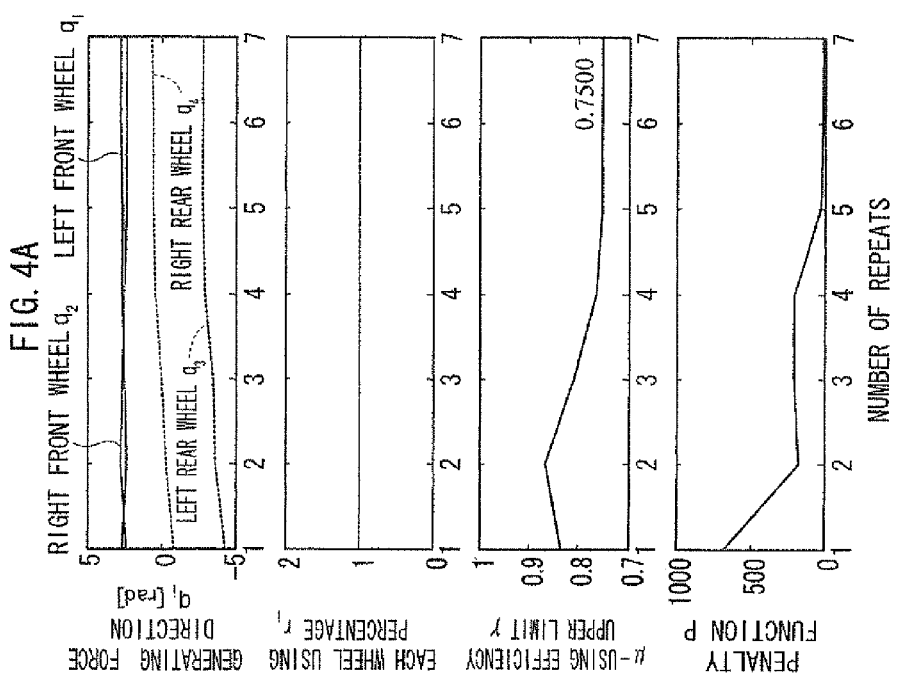
FIG. 4B is a schematic view showing the tire generating force direction and the like in each of the wheels per number of repeats in the result of computation in accordance with the present exemplary embodiment.

Further, FIGS. 4A and 4B show a result of computation per step in FIGS. 3A and 3B, that is, a result of computation per repeated number. As shown in FIG. 4B, a using percentage $r_4$ with respect to the μ-using efficiency of the right rear wheel comes to 0.1 corresponding to a previously set lower limit value, by applying the present exemplary embodiment. As a result, the upper limit value of the μ-using efficiency may be lowered at about 15% from 0.75 to 0.65.

In the control means in accordance with the present exemplary embodiment, there may be controlled as follows.

In the case of controlling the vehicle motion in such a manner as to obtain the computed each wheel tire generating force, if there exists the each wheel tire generating force generating the yaw moment in the reverse direction to the target yaw moment, the μ-using efficiency is controlled in such a manner that the Hμ-using efficiency of the wheel generating the tire generating force becomes smaller in comparison with the μ-using efficiency of the other wheels. In this case, it is effective to control the μ-using efficiency in the case that a product of the size of the target vehicle body longitudinal force and the target vehicle body transverse force and a representative length of a moment arm from a tire position to a vehicle center of gravity approximately coincides with the size of the target yaw moment.

When the outward yaw moment is demanded during the turning braking, there is controlled such that the μ-using efficiency of the turning inner front wheel becomes smaller in comparison with the μ-using efficiency of the other wheels.

When the inward yaw moment is demanded during the turning braking, there is controlled such that the μ-using efficiency of the turning outer rear wheel becomes smaller in comparison with the μ-using efficiency of the other wheels.

When the outward moment is demanded during the turning acceleration, there is controlled such that the μ-using efficiency of the turning outer front wheel becomes smaller in comparison with the μ-using efficiency of the other wheels.

When the inward moment is demanded during the tuning acceleration, there is controlled such that the μ-using efficiency of the turning inner rear wheel becomes smaller in comparison with the μ-using efficiency of the other wheels.

Next, a description will be given of an effect of reducing the μ-using efficiency. In the case that the target vehicle body force, that is, the target value of the vehicle body resultant force which is made up of the lateral force and the longitudinal force of the vehicle body is larger in comparison with the target yaw moment, that is, the product of the size of the target vehicle body force and the representative length of the moment arm from the tire position to the center of gravity of the vehicle is larger in comparison with the size of the target yaw moment, there may be generated the tire generating force distribution which efficiently utilizes the tire generating force and reduces the upper limit of the μ-using efficiency, by approximately harmonizing the generating direction of the tire generating force in each of the wheels with the direction of the target vehicle body force. In other words, the generating direction of the tire generating force in each of the wheels which is necessary and efficient for obtaining the target vehicle body force approximately coincides with the direction of the target vehicle body force.

On the other hand, in the case that the target vehicle body force is smaller in comparison with the target yaw moment, that is, the product of the size of the target vehicle body force and the representative length of the moment arm from the tire position to the center of gravity of the vehicle is smaller in comparison with the size of the target yaw moment, there is generated the tire generating force distribution which efficiently utilizes the tire generating force and lowers the upper limit of the μ-using efficiency, by approximately harmonizing the generating direction of the tire generating force in each of the wheels with the generating direction of the target yaw moment. In other words, the generating direction of the tire generating force in each of the wheels which is necessary and efficient for obtaining the target moment approximately coincides with the generating direction of the target yaw moment.

On the contrary, in the case that the target vehicle body force approximately coincides with the target yaw moment, that is, in the case that the product of the size of the target vehicle body force and the representative length of the moment arm from the tire position to the center of gravity of the vehicle approximately coincides with the size of the target moment, it is necessary to achieve both the tire generating force which is necessary for efficiently obtaining the target vehicle body force and the tire generating force which is necessary for efficiently obtaining the target yaw moment. At this time, in the wheel in which the direction of the target vehicle body force is reverse to the direction of the tire generating force generating the target yaw moment, the tire generating force for obtaining the target vehicle body force is cancelled by the tire generating force generating the target yaw moment, and the μ-using efficiency of this wheel becomes small. As mentioned above, in the case that the target vehicle body force approximately coincides with the target yaw moment, the using percentage of the tire generating force may be improved as a whole and the upper limit of the μ-using efficiency may be lowered, by making the μ-using efficiency of the wheel in which the direction of the target vehicle body force is reverse to the direction of the tire generating force generating the target yaw moment smaller in comparison with the other wheels.

Next, a description will be given of an effect in the case of reducing the load of the wheel lowering the μ-using efficiency. The load of the wheel having the great μ-using efficiency is increased by reducing the load of the wheel lowering the μ-using efficiency and moving the reduced amount of load to the other wheels. At this time, since the friction circle approximately described by the product of the road surface μ and the load becomes large, the μ-using efficiency (=size of tire generating force/size of friction circle) of the wheel having the large μ-using efficiency may be lowered. This means increasing the limit value of the vehicle body force moment in which the upper limit value of the μ-using efficiency comes to 1, that is, improving a marginal performance.

For example, if a roll rigidity distribution is distributed larger in the front wheels in the case that the outward yaw moment is demanded during the turning braking, and the μ-using efficiency of the turning inner front wheel is controlled so as to become smaller in comparison with the μ-using efficiency of the other wheels, the load difference between the right and left wheels in the front wheels becomes larger in comparison with the right and left wheels in the rear wheels, the load becomes smaller in the inner wheel of the front wheels, and the load becomes larger in the outer wheel of the front wheels. The μ-using efficiency is somewhat increased by lowering the load in the turning inner front wheel in which the μ-using efficiency is set smaller in comparison with the other wheels. On the other hand, the friction circle becomes larger in accordance with the increase of the load, in the turning outer front wheel. There may be effectively utilized the tire force of the turning outer front wheel which efficiently works for achieving both the target vehicle body force and moment, by again executing the optimum distribution of the tire generating force under this situation, whereby the marginal performance may be improved, or the upper limit value of the μ-using efficiency may be lowered, that is, a grip additional coverage may be improved.

In the same manner, if the roll rigidity distribution is distributed larger in the front wheels in the case that the inward yaw moment is demanded during the turning braking, and the μ-using efficiency of the turning outer rear wheel is controlled so as to become smaller in comparison with the μ-using efficiency of the other wheels, the load difference between the right and left wheels in the rear wheels becomes smaller in comparison with the right and left wheels in the front wheels, and the load of the turning outer rear wheel may be lowered and the load of the turning inner rear wheel may be increased, in comparison with a state of a standard roll rigidity distribution. The μ-using efficiency is somewhat increased by lowering the load in the turning outer rear wheel in which the Mμ-using efficiency is set smaller in comparison with the other wheels. On the other hand, the friction circle becomes larger in accordance with the increase of the load, in the turning inner rear wheel. There may be effectively utilized the tire force of the turning inner rear wheel which efficiently works for achieving both the target vehicle body force and moment, by again executing the optimum distribution of the tire generating force under this situation, whereby the marginal performance may be improved, or the upper limit value of the μ-using efficiency may be lowered, that is, a grip additional coverage may be improved.

Further, if the roll rigidity distribution is distributed larger in the rear wheels in the case that the outward yaw moment is demanded during the turning acceleration, and the μ-using efficiency of the turning outer front wheel is controlled so as to become smaller in comparison with the μ-using efficiency of the other wheels, the load difference between the right and left wheels in the front wheels becomes smaller in comparison with the right and left wheels in the rear wheels, the load of the turning outer front wheel may be lowered and the load of the turning inner front wheel may be increased, in comparison with the state of the standard roll rigidity distribution. The μ-using efficiency is somewhat increased by lowering the load in the turning outer front wheel in which the μ-using efficiency is set smaller in comparison with the other wheels. On the other hand, the friction circle becomes larger in accordance with the increase of the load, in the turning front wheel. There may be effectively utilized the tire force of the turning inner front wheel which efficiently works for achieving both the target vehicle body force and moment, by again executing the optimum distribution of the tire generating force under this situation, whereby the marginal performance may be improved, or the upper limit value of the μ-using efficiency may be lowered, that is, a grip additional coverage may be improved.

Further, if the roll rigidity distribution is distributed larger in the rear wheels in the case that the inward yaw moment is demanded during the turning acceleration, and the μ-using efficiency of the turning inner rear wheel is controlled so as to become smaller in comparison with the μ-using efficiency of the other wheels, the load difference between the right and left wheels in the rear wheels becomes larger in comparison with the right and left wheels in the front wheels, the load becomes smaller in the inner wheel of the rear wheels, and the load becomes larger in the outer wheel of the rear wheels. The μ-using efficiency is somewhat increased by lowering the load in the turning inner rear wheel in which the μ-using efficiency is set smaller in comparison with the other wheels. On the other hand, the friction circle becomes larger in accordance with the increase of the load, in the turning outer rear wheel. There may be effectively utilized the tire force of the turning outer rear wheel which efficiently works for achieving both the target vehicle body force and moment, by again executing the optimum distribution of the tire generating force under this situation, whereby the marginal performance may be improved, or the upper limit value of the μ-using efficiency may be lowered, that is, a grip additional coverage may be improved.

FIGS. 5A to 5C show a tire generating force distribution in the case that a lateral force 8000 N and a braking force 6000 N are demanded at a time of turning and braking on a high μ road having a road surface μ=1.0. In this case, the roll rigidity distribution at a normal time is set to 6:4 (=front wheel:rear wheel). When a command value of the yaw moment is 0, the μ-using efficiency in each of the wheels is uniformly distributed as shown in FIG. 5A. In this case, if a spin tendency is generated due to some kind or another reason, it is necessary to generate the outward yaw moment on the basis of the tire generating force distribution in each of the wheels. A case that the outward yaw moment command is generated is shown in FIGS. 5B and 5C. FIG. 5B shows the tire generating force distribution in each of the wheels at a time when the yaw moment is generated to the limit without changing the lateral force and the braking force, in a state in which the roll rigidity distribution is not changed. In this state, while the μ-using efficiency of the other wheels than the turning inner front wheel comes to 1, the pausing efficiency of the turning inner front wheel comes to a value about 0.3. Further, if the roll rigidity distribution is distributed larger (1:0) in the front wheels in correspondence to the each wheel using percentage (0.3) of the turning inner front wheel, the friction circle of the turning inner front wheel having the small each wheel using percentage becomes small, and the friction circle of the turning inner rear wheel having the large using percentage becomes large. At this time, if the optimization of the tire generating force distribution is executed on the basis of the friction circle in which the size is changed, the limit of the yaw moment which can be generated is increased at 16% or more, on the basis of an effective utilization of the friction circle. As mentioned above, increasing the limit of the generated yaw moment means improving the performance of the spin control, and it is known that a safety is further improved by changing the roll rigidity distribution on the basis of the integrated control in accordance with the present exemplary embodiment.

INDUSTRIAL APPLICABILITY

A safety may be improved by applying to the vehicle motion control device of the vehicle.

DESCRIPTION OF REFERENCE NUMERALS

10 using friction circle computing means
12 each wheel generating force computing means
14 control means

What is claimed is:

1. A vehicle motion control device for a vehicle having wheels, the vehicle motion control device, comprising:
   a using friction circle computing unit for computing a size of a using friction circle in each of the wheels by multiplying a size of an each wheel friction circle indicating a maximum generating force in each wheel tire by a previously computed each wheel using percentage;
   an each wheel generating force computing unit for computing the each wheel tire generating force and the each wheel using percentage indicating a rate with respect to an upper limit value of a μ-using efficiency in each of the wheels, on the basis of a target vehicle body force and moment indicating a target vehicle body longitudinal force, a target vehicle body transverse force and a target yaw moment, and the sizes of the using friction circles computed by the using friction circle computing means; and
   a control unit for controlling a vehicle motion on the basis of the computed each wheel tire generating force,
   wherein the each wheel using percentage is a ratio of the μ-using efficiency in each of the wheels with respect to an upper limit of the μ-using efficiency, and
   the each wheel using percentage is: i) included as a parameter for computing the each wheel tire generating force, and ii) is determined repeatedly for each of the wheels, and
   the each wheel generating force computing unit comprises:
      an each wheel generating force direction computing unit for computing a direction of the each wheel tire generating force minimizing the upper limit value of the μ-using efficiency under the constraint condition that the target vehicle body force and moment are achieved, on the basis of the target vehicle body force and moment and the size of the using friction circle in each of the wheels;
      an each wheel using percentage computing unit for computing an each wheel using percentage indicating a rate with respect to the upper limit value of the μ-using efficiency in each of the wheels in such a manner as to lower the upper limit value of the μ-using efficiency under the constraint condition that the target vehicle body force and moment are achieved;
      an each wheel generating force direction correcting unit for correcting the direction of the each wheel tired are generating force in correspondence to the each wheel using percentage computed by the each wheel using percentage computing unit, in such a manner as to achieve the target vehicle body force and moment; and
      an each wheel generating force corrected computing unit for computing the each wheel tire generating force on the basis of the computed each wheel using percentage, the corrected each wheel tire generating force direction, and a minimized upper limit value of the μ-using efficiency.

2. The vehicle motion control device of claim 1, wherein the control unit comprises:
   a control amount computing unit for computing a first control amount controlling at least one of a braking force or a driving force in each of the wheels, or the first control amount and a second control amount controlling a steered angle of each of the wheels, on the basis of the each wheel tire generating force computed by the each wheel generating force computing unit; and
   a braking and driving steered angle control unit for controlling at least one of the braking force or the driving force in each of the wheels on the basis of the first control amount, or controlling at least one of the braking force or the driving force in each of the wheels and the steered angle of each of the wheels on the basis of the first control amount and the second control amount.

3. The vehicle motion control device of claim 1, wherein the vehicle motion control device controls the μ-using efficiency of a turning inner front wheel so as to become smaller in comparison with the μ-using efficiency of the other wheels, at a time when an outward yaw moment is demanded during a turning braking.

4. The vehicle motion control device of claim 1, wherein the vehicle motion control device controls the μ-using efficiency of a turning outer rear wheel so as to become smaller in comparison with the μ-using efficiency of the other wheels, at a time when an inward yaw moment is demanded during a turning braking.

5. The vehicle motion control device of claim 1, wherein the vehicle motion control device controls the μ-using efficiency of a turning outer front wheel so as to become smaller in comparison with the μ-using efficiency of the other wheels, at a time when an outward moment is demanded during a turning acceleration.

6. The vehicle motion control device of claim 1, wherein the vehicle motion control device controls the μ-using efficiency of a turning inner rear wheel so as to become smaller in comparison with the μ-using efficiency of the other wheels, at a time when an inward moment is demanded during a turning acceleration.

7. A vehicle motion control device for controlling a μ-using efficiency in such a manner that a μ-using efficiency of a wheel in which a yaw moment in a reverse direction to a target yaw moment is generated becomes smaller in comparison with a μ-using efficiency of the other wheels, in the case that the yaw moment in the reverse direction is generated in the wheel, at a time of generating a tire generating force in each of the wheels in the direction of a target vehicle body force comprising a target vehicle body longitudinal force and a target vehicle body transverse force,
   wherein the vehicle motion control device comprises:
      a using friction circle computing unit for computing a size of a using friction circle in each of the wheels by multiplying a size of an each wheel friction circle indicating a maximum generating force in each wheel tire by a previously computed each wheel using percentage;
      an each wheel generating force computing unit for computing an each wheel tire generating force and the each wheel using percentage indicating a rate with respect to an upper limit value of the μ-using efficiency in each of the wheels, on the basis of the target vehicle body force and moment indicating the target vehicle body longitudinal force, the target vehicle body transverse force and the target yaw moment, and the sizes of the using friction circles computed by the using friction circle computing means; and
      a control unit for controlling a vehicle motion on the basis of the computed each wheel tire generating force,
   wherein the each wheel using percentage is a ratio of the μ-using efficiency in each of the wheels with respect to an upper limit of the μ-using efficiency, and
   the each wheel using percentage is: i) included as a parameter for computing the each wheel tire generating force, and ii) determined repeatedly for each of the wheels, and
   the each wheel generating force computing unit comprises:
      an each wheel generating force direction computing unit for computing a direction of the each wheel tire generating force minimizing the upper limit value of the μ-using efficiency under the constraint condition that the target vehicle body force and moment are achieved, on the basis of the target vehicle body force and moment and the size of the using friction circle in each of thee wheels;
      an each wheel using percentage computing unit for computing an each wheel using percentage indicating a rate with respect to the upper limit value of the μ-using efficiency in each of the wheels in such a manner as to lower the upper limit value of the μ-using efficiency under the constraint condition that the target vehicle hod force and moment are achieved;
      an each wheel generating force direction correcting unit for correcting the direction of the each wheel tire generating force in correspondence to the each wheel using percentage computed by the each wheel using percentage computing unit, in such a manner as to achieve the target vehicle body force and moment; and
      an each wheel generating force corrected computing unit for computing the each wheel tire generating force on the basis of the computed each wheel using percentage, the corrected each wheel tire generating force direction, and a minimized upper limit value of the μ-using efficiency.

8. The vehicle motion control device of claim 7, wherein the vehicle motion control device carries out the control of the μ-using efficiency in the case that a product of the size of the target vehicle body longitudinal force and the target vehicle body transverse force and a representative length of a moment arm from a tire position to a center of gravity of the vehicle approximately coincides with the size of the target yaw moment.

9. The vehicle motion control device of claim 7, wherein the vehicle motion control device controls a load in each of the wheels in such a manner as to lower the load in the wheel to be controlled, in the case of controlling the μ-using efficiency so as to become smaller in comparison with the μ-using efficiency of the other wheels.

10. The vehicle motion control device of claim 9, wherein a roll rigidity distribution is distributed larger to the front wheels so that a load of a turning inner front wheel is lowered in the case that an outward moment is demanded during a turning braking and the μ-using efficiency of the turning inner front wheel is controlled so as to become smaller in comparison with the μ-using efficiency of the other wheels.

11. The vehicle motion control device of claim 9, wherein a roll rigidity distribution is distributed larger to the front wheels so that the load of a turning outer rear wheel is lowered in the case that an inward moment is demanded during a turning braking and the μ-using efficiency of the turning outer rear wheel is controlled so as to become smaller in comparison with the μ-using efficiency of the other wheels.

12. The vehicle motion control device of claim 9, wherein a roll rigidity distribution is distributed larger to the rear wheels so that the load of a turning outer front wheel is lowered in the case that an outward moment is demanded during a turning acceleration and the μ-using efficiency of the turning outer front wheel is controlled so as to become smaller in comparison with the μ-using efficiency of the other wheels.

13. The vehicle motion control device of claim 9, wherein a roll rigidity distribution is distributed larger to the rear wheels so that the load of a turning inner rear wheel is lowered in the case that an inward moment is demanded during a turning acceleration and the μ-using efficiency of the turning inner rear wheel is controlled so as to become smaller in comparison with the μ-using efficiency of the other wheels.

14. The vehicle motion control device of claim 7, wherein when a minimum each wheel using percentage in all the wheels becomes equal to or less than a reference value, in the case that the wheel becoming equal to or less than the reference value is a turning inner front wheel or a turning outer rear wheel, a roll rigidity distribution is distributed largely to the front wheels in correspondence to the each wheel using percentage, and in the case that the wheel becoming equal to or less than the reference value is a turning outer front wheel or a turning inner rear wheel, the roll rigidity distribution is distributed largely to the rear wheels in correspondence to the each wheel using percentage.

15. A vehicle motion control method for controlling a μ-using efficiency in such a manner that a μ-using efficiency of a wheel in which a yaw moment in a reverse direction to a target yaw moment is generated becomes smaller in comparison with a μ-using efficiency of the other wheels, in the case of generating the yaw moment in the reverse direction in the wheel, at a time of generating a tire generating force in each of the wheels in the direction of a target vehicle body force comprising a target vehicle body longitudinal force and a target vehicle body transverse force, the method comprising:

computing a size of a using friction circle in each of the wheels by multiplying a size of an each wheel friction circle indicating a maximum generating force in each wheel tire by a previously computed each wheel using percentage;

computing an each wheel tire generating force and the each wheel using percentage indicating a rate with respect to an upper limit value of the μ-using efficiency in each of the wheels, on the basis of the target vehicle body force and moment indicating the target vehicle body longitudinal force, the target vehicle body transverse force and the target yaw moment, and the sizes of the using friction circles; and controlling a vehicle motion on the basis of the computed each wheel tire generating force, wherein the each wheel using percentage is a ratio of the μ-using efficiency in each of the wheels with respect to an upper limit of the p, using efficiency, and the each wheel using percentage is: i) included as a parameter for computing the each wheel tire generating force, and ii) determined repeatedly for each of the wheels, and the each wheel tire generating force is computed by an each wheel generating force computing unit comprising:

an each wheel generating direction computing unit for computing a direction of the each wheel tire generating force minimizing the upper limit value of the μ-using efficiency under the constraint condition that the target vehicle body force and moment are achieved, on the basis of the target vehicle body force and moment and the size of the using friction circle in each of the wheels:

an each wheel using percentage computing unit for computing an each wheel using percentage indicating a rate with respect to the upper limit value of the μ-using efficiency in each of the wheels in such a manner as to lower the upper limit value of the μ-using efficiency under the constraint condition that the target vehicle body force and moment are achieved;

an each wheel generating force direction correcting unit for correcting the direction of the each wheel tire generating force in correspondence to the each wheel using percentage computed by the each wheel using percentage computing unit, in such a manner as to achieve the target vehicle body three and moment; and an each wheel generating force corrected computing unit for computing the each wheel tire generating force on the basis of the computed, each wheel using percentage, the corrected each wheel tire generating force direction, and a minimized upper limit value of the μ-using efficiency.

16. The vehicle motion control method of claim 15, wherein the vehicle motion control method carries out the control of the μ-using efficiency in the case that a product of the size of the target vehicle body longitudinal force and the target vehicle body transverse force and a representative length of a moment arm from a tire position to a center of gravity of the vehicle approximately coincides with the size of the target yaw moment.

17. The vehicle motion control method of claim 15, wherein the vehicle motion control method controls the μ-using efficiency of a turning inner front wheel so as to become smaller in comparison with the μ-using efficiency of the other wheels, at a time when an outward yaw moment is demanded during a turning braking.

18. The vehicle motion control method of claim 15, wherein the vehicle motion control method controls the μ-using efficiency of a turning outer rear wheel so as to become smaller in comparison with the μ-using efficiency of the other wheels, at a time when an inward yaw moment is demanded during a turning braking.

19. The vehicle motion control method of claim 15, wherein the vehicle motion control method controls the μ-using efficiency of a turning outer front wheel so as to become smaller in comparison with the μ-using efficiency of the other wheels, at a time when an outward moment is demanded during a turning acceleration.

20. The vehicle motion control method of claim 15, wherein the vehicle motion control method controls the μ-using efficiency of a turning inner rear wheel so as to become smaller in comparison with the μ-using efficiency of the other wheels, at a time when an inward moment is demanded during a turning acceleration.

* * * * *